(12) United States Patent
Koyano et al.

(10) Patent No.: US 11,161,575 B2
(45) Date of Patent: Nov. 2, 2021

(54) SMALL CRAFT AND SMALL CRAFT TRAILING SYSTEM

(71) Applicant: YAMAHA HATSUDOKI KABUSHIKI KAISHA, Iwata (JP)

(72) Inventors: Satoshi Koyano, Shizuoka (JP); Shu Akuzawa, Shizuoka (JP); Yusuke Ashida, Shizuoka (JP); Hirotaka Aoki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 700 days.

(21) Appl. No.: 15/726,762

(22) Filed: Oct. 6, 2017

(65) Prior Publication Data
US 2018/0050772 A1 Feb. 22, 2018

Related U.S. Application Data

(63) Continuation of application No. PCT/JP2016/061698, filed on Apr. 11, 2016.

(30) Foreign Application Priority Data

Apr. 9, 2015 (JP) .............................. JP2015-079876

(51) Int. Cl.
*B63B 49/00* (2006.01)
*B63C 3/12* (2006.01)
(Continued)

(52) U.S. Cl.
CPC ............ *B63B 49/00* (2013.01); *B60P 3/1033* (2013.01); *B63C 3/12* (2013.01); *B63H 21/21* (2013.01);
(Continued)

(58) Field of Classification Search
CPC ........ B63B 49/00; B63H 21/22; B63H 25/46; B63H 25/04; B63H 21/28; B63H 21/265;
(Continued)

(56) References Cited

U.S. PATENT DOCUMENTS

2003/0200911 A1* 10/2003 Tatro ........................ B60D 1/36
116/28 R
2007/0113769 A1* 5/2007 Stallings ................ B63H 25/04
114/144 R
(Continued)

FOREIGN PATENT DOCUMENTS

JP 2002-019516 A 1/2002
JP 2013-103525 A 5/2013

OTHER PUBLICATIONS

Official Communication issued in International Patent Application No. PCT/JP2016/061698, dated Jun. 28, 2016.

*Primary Examiner* — Mathew Franklin Gordon
(74) *Attorney, Agent, or Firm* — Keating and Bennett, LLP

(57) ABSTRACT

A small craft includes a craft body, a propulsion device configured to propel the craft body, a position acquisition portion configured to acquire positional information about a trailer on which the craft body is loadable, and a controller configured to control the propulsion device on the basis of the positional information about the trailer acquired by the position acquisition portion during an operation for releasing the craft body from the trailer and/or an operation for attaching the craft body to the trailer.

26 Claims, 21 Drawing Sheets

(51) Int. Cl.

| | |
|---|---|
| *B63H 21/21* | (2006.01) |
| *B63H 25/04* | (2006.01) |
| *B63H 25/46* | (2006.01) |
| *G08G 3/02* | (2006.01) |
| *G05D 1/02* | (2020.01) |
| *B60P 3/10* | (2006.01) |

(52) U.S. Cl.
CPC ............ *B63H 25/04* (2013.01); *B63H 25/46* (2013.01); *G05D 1/0206* (2013.01); *G08G 3/02* (2013.01); *B63H 2021/216* (2013.01)

(58) Field of Classification Search
CPC .. B63H 21/26; B63H 21/24; B63H 2021/216; B63H 21/21; G08G 3/02; G05D 1/0206; B63C 3/10; B63C 3/06; B63C 3/02; B63C 3/00; B60P 3/1091; B60P 3/1075; B60P 3/1058; B60P 3/1033
See application file for complete search history.

(56) References Cited

U.S. PATENT DOCUMENTS

| | | | |
|---|---|---|---|
| 2011/0104963 A1* | 5/2011 | Ellis ........................ | G01S 19/01 |
| | | | 440/6 |
| 2013/0110329 A1 | 5/2013 | Kinoshita et al. | |
| 2013/0147156 A1* | 6/2013 | Velton ................... | B60P 3/1066 |
| | | | 280/414.1 |
| 2013/0297104 A1* | 11/2013 | Tyers ..................... | B63H 21/21 |
| | | | 701/21 |
| 2016/0039504 A1* | 2/2016 | Okamoto ............. | B63H 21/213 |
| | | | 415/35 |
| 2016/0264220 A1* | 9/2016 | Laceky ................ | H04N 5/2256 |

\* cited by examiner

WHEN ORIENTATION IS NOT WITHIN THRESHOLD RANGE

WHEN CRAFT BODY RETURN ALONG SAILING TRACK

CONTROL FLOW DURING RELEASE OPERATIONS (SECOND EMBODIMENT)

FIG. 12 CONTROL FLOW DURING ATTACHMENT OPERATIONS (SECOND EMBODIMENT)

FIG. 15  CONTROL FLOW DURING RELEASE OPERATIONS (FOURTH EMBODIMENT)

FIG. 16 CONTROL FLOW DURING ATTACHMENT OPERATIONS (FOURTH EMBODIMENT)

ENGINE ROTATIONAL SPEED-THRUST FORCE
CHARACTERISTICS DURING BACKWARD PROPULSION $Y_2 = B \cdot X_2^\beta$

SMALL CRAFT AND SMALL CRAFT TRAILING SYSTEM

CROSS-REFERENCE TO RELATED APPLICATION

The priority application number JP2015-079876, entitled "Small Craft and Small Craft Trailing System", and filed Apr. 9, 2015, by Satoshi Koyano, Shu Akuzawa, and Yuusuke Ashida, upon which this patent application is based, is hereby incorporated by reference in its entirety. This application is a continuation of International Application PCT/JP2016/061698, entitled "Small Craft and Small Craft Trailing System", and filed on Apr. 11, 2016, by Satoshi Koyano, Shu Akuzawa, Yuusuke Ashida, and Hirotaka Aoki, which is hereby incorporated by reference in its entirety.

BACKGROUND OF THE INVENTION

Field of the Invention

The present invention relates to a small craft and a small craft trailing system.

Description of the Background Art

A device configured to land a small craft from a water surface and release the small craft to the water surface is known in general. Such a device is disclosed in Japanese Patent Laying-Open No. 2002-019516, for example.

Japanese Patent Laying-Open No. 2002-019516 discloses a lifting device configured to land a small craft and release the small craft to a water surface. This lifting device includes a wheeled platform capable of traveling on land and the bottom of water, a craft body loading device provided on the wheeled platform and configured to be capable of lifting in a state where a craft body of the small craft is loaded thereon, and a radio control device. According to Japanese Patent Laying-Open No. 2002-019516, when the small craft is landed, on the basis of operations of a user on the radio control device, the lifting device is moved to the bottom of the water immediately beneath the small craft floating on the water surface, and thereafter the craft body loading device of the lifting device is uplifted and is caused to support the craft body of the small craft from below. Furthermore, on the basis of an operation of the user on the radio control device, the lifting device is moved onshore from the bottom of the water, whereby the small craft is landed. When the small craft is released to the water surface, reverse operations to the operations during landing are performed.

In the lifting device according to Japanese Patent Laying-Open No. 2002-019516, however, the user is required to accurately move the lifting device distant from the user to immediately beneath the small craft floating on the water surface and to cause the craft body loading device to uplift the craft body of the small craft on the water surface in a balanced manner and support the craft body from below by operating the radio control device when the small craft is landed. Also when the small craft is released to the water surface, the user is required to accurately move the lifting device distant from the user to a desired position by operating the radio control device. Consequently, it is difficult to accurately operate the lifting device. Therefore, by the lifting device according to Japanese Patent Laying-Open No. 2002-019516, the small craft may not be capable of being easily attached and released.

SUMMARY OF THE INVENTION

Embodiments of the present application provide a small craft and a small craft trailing system each facilitating at least one of attachment and release.

A small craft according to a first aspect of the present invention includes a craft body, a propulsion device configured to propel the craft body, a position acquisition portion configured to acquire positional information about a trailer on which the craft body is loaded, and a controller configured to control the propulsion device on the basis of the positional information about the trailer acquired by the position acquisition portion during at least one of an operation for releasing the craft body from the trailer and an operation for attaching the craft body to the trailer.

As hereinabove described, the small craft according to the first aspect is provided with the controller configured to control the propulsion device on the basis of the positional information about the trailer acquired by the position acquisition portion during at least one of the operation for releasing the craft body from the trailer and the operation for attaching the craft body to the trailer. Thus, the controller can properly control the propulsion device according to the position of the trailer, and hence a user can release the small craft from the trailer and/or attach the small craft to the trailer without advanced (considerable) skill to operate the small craft. Consequently, the small craft can be easily attached and/or released.

In the aforementioned small craft according to the first aspect, the controller is preferably configured to acquire a distance from the craft body to the trailer on the basis of the positional information about the trailer acquired by the position acquisition portion and to control the propulsion device on the basis of the acquired distance. According to this structure, the controller can properly control the propulsion device according to the distance from the craft body to the trailer, and hence the user can reliably release the small craft from the trailer and/or attach the small craft to the trailer without the advanced skill to operate the small craft.

In this case, the controller is preferably configured to acquire the orientation of the craft body with respect to the trailer, in addition to the distance, on the basis of the positional information about the trailer acquired by the position acquisition portion and to control the propulsion device to move the craft body to an attachment position of the trailer for the craft body on the basis of the distance and the orientation. According to this structure, the controller can more properly control the propulsion device according to the orientation of the craft body with respect to the trailer in addition to the distance from the craft body to the trailer, and hence the user can more reliably attach the small craft to the trailer without the advanced skill to operate the small craft.

In the aforementioned structure including the controller configured to control the propulsion device to move the craft body to the attachment position, the small craft preferably further includes a position detection portion configured to detect positional information about the craft body and a first recording portion configured to record a sailing track of the craft body, and the controller is preferably configured to record the sailing track of the craft body in the first recording portion on the basis of the positional information about the craft body detected by the position detection portion when moving the craft body to the attachment position and to control the propulsion device to cause the craft body to return to a position, from which the craft body is movable to the attachment position, along the sailing track of the craft body recorded in the first recording portion when failing to move the craft body to the attachment position. According to this structure, the small craft can automatically return to the position from which the craft body is movable to the attachment position along the sailing track of the craft body even when the craft body is unintentionally moved due to disturbance factors unique to the small craft, such as waves and wind, and fails to be moved to the attachment position. Thus, the user can still more reliably attach the small craft to the trailer without the advanced skill to operate the small craft even when the disturbance factors occur.

In the aforementioned structure including the controller configured to control the propulsion device to move the craft body to the attachment position, the controller is preferably configured to control the propulsion device to move the craft body to the attachment position when at least one of the speed of the craft body, the rotational speed of an engine, the acceleration of the craft body, and the angular speed of the craft body is not more than a corresponding prescribed threshold. According to this structure, improper control of the propulsion device by the controller resulting from at least one of the high speed of the craft body, the high rotational speed of the engine, the high acceleration of the craft body, and the high angular speed of the craft body can be significantly reduced or prevented.

In the aforementioned structure including the controller configured to control the propulsion device to move the craft body to the attachment position, the small craft preferably further includes a second recording portion configured to record the attachment position, and the controller is preferably configured to determine whether or not the craft body is movable to the attachment position on the basis of the attachment position recorded in the second recording portion. According to this structure, even when the trailer transmits no signal related to the positional information about the trailer, the small craft can recognize the attachment position of the trailer on the basis of the attachment position recorded in the second recording portion. Consequently, the controller can reliably determine whether or not the craft body is movable to the attachment position.

In the aforementioned structure including the controller configured to control the propulsion device to move the craft body to the attachment position, the controller is preferably configured to determine whether or not the craft body has been attached to the attachment position on the basis of the positional information about the trailer acquired by the position acquisition portion. According to this structure, the controller not only controls the propulsion device but also determines whether or not the craft body has been attached to the attachment position on the basis of the positional information about the trailer, and hence user's labor of attaching the small craft can be reduced.

The aforementioned small craft according to the first aspect preferably further includes a radio remote control to be operated by a user, configured to transmit an operation signal, and the controller is preferably configured to control the propulsion device on the basis of the positional information about the trailer acquired by the position acquisition portion when receiving the operation signal from the radio remote control. According to this structure, the user can instruct the small craft to be released from the trailer and/or be attached to the trailer even from a position away from the small craft by the radio remote control on hand. Furthermore, the user simply operates the radio remote control, whereby the controller automatically releases the small craft from the trailer and/or attaches the small craft to the trailer, and hence the convenience of the user can be improved.

The aforementioned small craft according to the first aspect preferably further includes an attitude detection portion configured to detect the attitude of the craft body, and the controller is preferably configured to control the propulsion device on the basis of the attitude of the craft body acquired by the attitude detection portion, in addition to the positional information about the trailer acquired by the position acquisition portion. According to this structure, the controller can properly control the propulsion device according to not only the position of the trailer but also the attitude of the craft body, and hence the user can even more reliably release the small craft from the trailer and/or attach the small craft to the trailer without the advanced skill to operate the small craft.

In the aforementioned small craft according to the first aspect, the controller is preferably configured to control the propulsion device on the basis of weather information, in addition to the positional information about the trailer acquired by the position acquisition portion. According to this structure, the controller can more properly control the propulsion device in consideration of not only the positional information about the trailer but also weather conditions that are the disturbance factors unique to the small craft, such as the waves and wind.

In the aforementioned small craft according to the first aspect, the controller is preferably configured to control the propulsion device to propel the craft body backward in a direction away from an attachment position of the trailer for the craft body on the basis of the positional information about the trailer acquired by the position acquisition portion. According to this structure, the craft body can be properly propelled backward according to the position of the trailer, and hence the user can easily and reliably release the small craft from the trailer without the advanced skill to operate the small craft.

In this case, the controller is preferably configured to control the propulsion device to hold the craft body at a fixed point away from the attachment position. In a conventional small craft (comparative example), the user is required to fix the small craft to a dock or the like after releasing the small craft from the trailer and leave the small craft to move a vehicle towing the trailer. According to the aforementioned structure, on the other hand, the user can move the vehicle towing the trailer while the small craft is held at a fixed point, and hence user's labor of fixing the small craft to the dock or the like can be reduced.

In the aforementioned structure including the controller configured to control the propulsion device to propel the craft body backward, the controller is preferably configured to determine whether or not to propel the craft body backward in the direction away from the attachment position on the basis of at least one of the fixation state of a fixation portion configured to fix the craft body to the trailer, the position of the propulsion device in a vertical direction relative to a water surface, and a presence or absence of an obstacle around the craft body. According to this structure, the controller previously determines whether or not the small craft can be propelled backward from the attachment position, whereby the small craft can be accurately propelled backward.

In this case, the small craft preferably further includes an obstacle detection portion configured to detect whether or not an obstacle is around the craft body, and the controller is preferably configured to control the propulsion device to stop propelling the craft body backward when determining that the obstacle has appeared on the basis of a detection result of the obstacle detection portion during backward propulsion of the craft body in the direction away from the attachment position. According to this structure, the controller determines whether or not the small craft can be propelled backward from the attachment position on the basis of whether or not the obstacle has appeared even during backward propulsion of the craft body, and hence the small craft can be more accurately propelled backward.

In the aforementioned small craft according to the first aspect, the position acquisition portion preferably includes a target recognizer. According to this structure, the positional information about the position of the trailer is easily acquired by recognizing the position of the trailer with the target recognizer.

In the aforementioned small craft according to the first aspect, the position acquisition portion preferably includes a receiving portion configured to receive a signal transmitted from a transmitter of the trailer. According to this structure, the positional information about the trailer can be easily acquired from the signal transmitted from the transmitter of the trailer.

The aforementioned small craft according to the first aspect preferably further includes an obstacle detection portion arranged vertically above a chine line of the craft body, and configured to detect whether an obstacle is around the craft body. According to this structure, it is possible to restrain the obstacle detection portion from being located under water, and hence it is possible to restrain the obstacle detection portion from failing to sufficiently detect the obstacle. The term "vertically above" means upward (a direction away from the water surface) in a direction away from which the gravity acts.

In the aforementioned small craft according to the first aspect, the trailer is preferably provided with a supporting portion on which the craft body is loadable and an indicator arranged vertically above the supporting portion, and the position acquisition portion is preferably configured to acquire the trailer positional information on the basis of the position of the indicator. According to this structure, the indicator arranged vertically above the supporting portion enables the position acquisition portion to more reliably acquire the trailer positional information.

The aforementioned small craft according to the first aspect preferably further includes a switching operation portion configured to allow a user to switch a shift state of the propulsion device and a throttle opening of the propulsion device, and the controller is preferably configured to perform at least one of the operation for releasing the craft body from the trailer and the operation for attaching the craft body to the trailer by controlling the propulsion device when the switching operation portion is operated such that the shift state of the propulsion device is a neutral state and the throttle opening of the propulsion device is an idling opening. If the switching operation portion is operated such that the shift state of the propulsion device is a forward movement state and the throttle opening of the propulsion device is larger than the idling opening, a thrust force to move the craft body forward may be unexpectedly generated in the propulsion device when at least one of the operation for releasing the craft body from the trailer and the operation for attaching the craft body to the trailer is finished. Thus, according to the aforementioned structure of the present invention, unexpected generation of the thrust force in the propulsion device is significantly reduced or prevented, and hence switching between the time of at least one of the operation for releasing the craft body from the trailer and the operation for attaching the craft body to the trailer and the time of a non-operation is smoothly made.

In the aforementioned small craft according to the first aspect, the controller is preferably configured to acquire the orientation of the craft body with respect to a supporting portion of the trailer on which the craft body is loadable on the basis of the trailer positional information when moving the craft body to an attachment position and to control the propulsion device such that the orientation of the craft body is substantially parallel to a direction in which the supporting portion extends on the basis of the orientation of the craft body with respect to the supporting portion of the trailer. According to this structure, it is possible to significantly reduce or prevent the possibility that the orientation of the craft body fails to be substantially parallel to the direction in which the supporting portion extends during the operation for attaching the craft body to the trailer, and hence it is possible to prevent the craft body from deviating from the trailer. Consequently, it is possible to reliably and significantly reduce or prevent the possibility that the craft body cannot be attached to the supporting portion of the trailer.

In this case, the controller is preferably configured to control the propulsion device such that at least one of the position and orientation of the craft body is held in the vicinity of the attachment position. According to this structure, it is possible to more reliably restrain the craft body from deviating from the trailer regardless of disturbance or the like immediately before attaching the craft body in the vicinity of the attachment position, and hence it is possible to more reliably and significantly reduce or prevent the possibility that the craft body cannot be attached to the supporting portion of the trailer.

In the aforementioned small craft according to the first aspect, the propulsion device preferably includes a plurality of propulsion devices, and steering of the plurality of propulsion devices is preferably controllable independently of each other. According to this structure, the small craft is enabled to easily turn, move back and forth, move parallel from side to side, turn its bow, etc., and hence it is possible to control the movement of the small craft in more detail.

In the aforementioned small craft according to the first aspect, the controller is preferably configured to acquire the thrust force of the propulsion device from at least one of the rotational speed of an engine and the rotational speed of a propeller and to control the thrust force of the propulsion device on the basis of the acquired thrust force of the propulsion device. According to this structure, a thrust force to be output hereafter from the propulsion device is able to be controlled on the basis of the acquired thrust force of the propulsion device, and hence the propulsion device is more accurately controlled.

A small craft trailing system according to a second aspect of the present invention includes a small craft and a trailer, including a signal output portion configured to output a signal, on which the small craft is loaded, and the small craft includes a craft body loaded on the trailer, a propulsion device configured to propel the craft body, a position acquisition portion configured to acquire positional information about the trailer by receiving the signal output from the signal output portion of the trailer, and a controller configured to control the propulsion device on the basis of the positional information about the trailer acquired by the position acquisition portion during at least one of an operation for releasing the craft body from the trailer and an operation for attaching the craft body to the trailer.

In the small craft trailing system according to the second aspect, as hereinabove described, the small craft is provided with the controller configured to control the propulsion device on the basis of the positional information about the trailer acquired by the position acquisition portion during at least one of the operation for releasing the craft body from the trailer and the operation for attaching the craft body to the trailer. Thus, the small craft can be easily attached and/or released, similarly to the aforementioned first aspect. Furthermore, the trailer is provided with the signal output portion configured to output the signal, whereby the position of the trailer can be clearly recognized in the small craft.

In the aforementioned small craft trailing system according to the second aspect, the signal output portion of the trailer preferably includes a transmitter configured to transmit the signal. According to this structure, the small craft can easily acquire the positional information about the position of the trailer from the signal transmitted from the transmitter of the trailer.

In this case, the transmitter preferably includes a plurality of transmitters mounted on the trailer. According to this structure, the small craft more reliably acquires the position of the trailer using signals from the plurality of transmitters mounted on the trailer. Thus, the small craft is more accurately released from the trailer and/or attached to the trailer.

The aforementioned small craft trailing system according to the second aspect preferably further includes a radio remote control to be operated by a user, configured to transmit an operation signal, and the controller of the small craft is preferably configured to control the propulsion device on the basis of the positional information about the trailer acquired by the position acquisition portion when receiving the operation signal from the radio remote control. According to this structure, the user can instruct the small craft to be released from the trailer and/or be attached to the trailer even from a position away from the small craft by the radio remote control on hand. Furthermore, the user simply operates the radio remote control, whereby the controller of the small craft automatically releases the small craft from the trailer and/or attaches the small craft to the trailer, and hence the convenience of the user can be improved.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment (Outline of Trailing System)

An outline of a trailing system 100 according to a first embodiment of the present invention is now described with reference to FIGS. 1 and 2. The trailing system 100 is an example of the "small craft trailing system" in the present invention.

Figure 1:
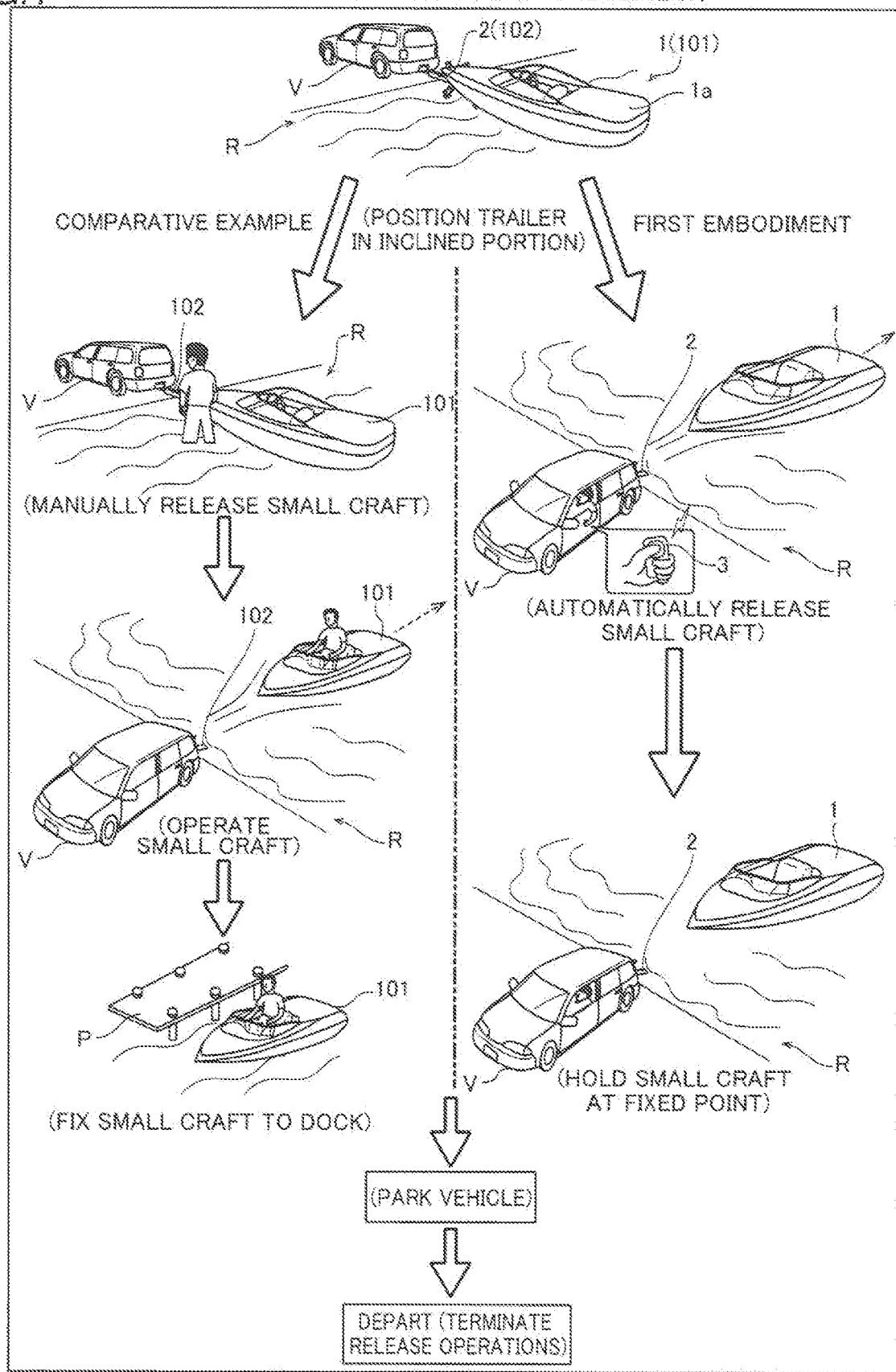
FIG. 1 is a diagram schematically showing operations involved in release in a trailing system according to a first embodiment of the present invention.

The trailing system 100 is a system capable of releasing a small craft 1 from a trailer 2 and attaching the small craft 1 to the trailer 2, as shown in FIG. 1. The small craft 1 is loaded on the trailer 2 while attached to the trailer 2, and the trailer 2 is towed by a vehicle V that a user drives. When the small craft 1 is moved (released) from the trailer 2 on land to a water surface in the trailing system 100, the user drives the vehicle V and moves the trailer 2 to an inclined portion (ramp) R formed near water, inclined downward to the bottom of water, as shown in a right portion of FIG. 1. The user operates a remote controller 3 to switch to an automatic trailer mode. In the automatic trailer mode, the small craft 1 automatically moves in a direction (along a dashed arrow in FIG. 1) away from the trailer 2 to be automatically released from the trailer 2. Then, the small craft 1 is held at a fixed point away from the trailer 2, and the automatic trailer mode is terminated. After parking the vehicle V at a prescribed parking position, the user operates the remote controller 3 to move the small craft 1 to a position from which the user easily gets into the small craft 1, such as a dock P, and gets into the small craft 1 from the position. Finally, the user operates the small craft 1 to depart.

In conventional release of a small craft 101 (comparative example), on the other hand, the user separates the small craft 101 from a trailer 102 moved to the inclined portion R by manually releasing the small craft 101 from the trailer 102, as shown in a left portion of FIG. 1. The user gets into the small craft 101 in a state where the vehicle V is left at the inclined portion R. Then, the user moves the small craft 101 in a direction (along another dashed arrow in FIG. 1) away from the trailer 102, operates the small craft 101 to the dock P, and fixes the small craft 101 to the dock P. Then, after returning to the inclined portion R and parking the vehicle V, which is left at the inclined portion R, at the prescribed parking position, the user returns to the dock P and gets into the small craft 101 again. Finally, the user operates the small craft 101 to depart.

Consequently, in the trailing system 100 according to the first embodiment, the user can promptly and easily release the small craft 1 from the trailer 2 and depart without traveling back and forth between the inclined portion R and the dock P and without fixing the small craft 1, as compared with in the conventional release of the small craft 101.

Figure 2:
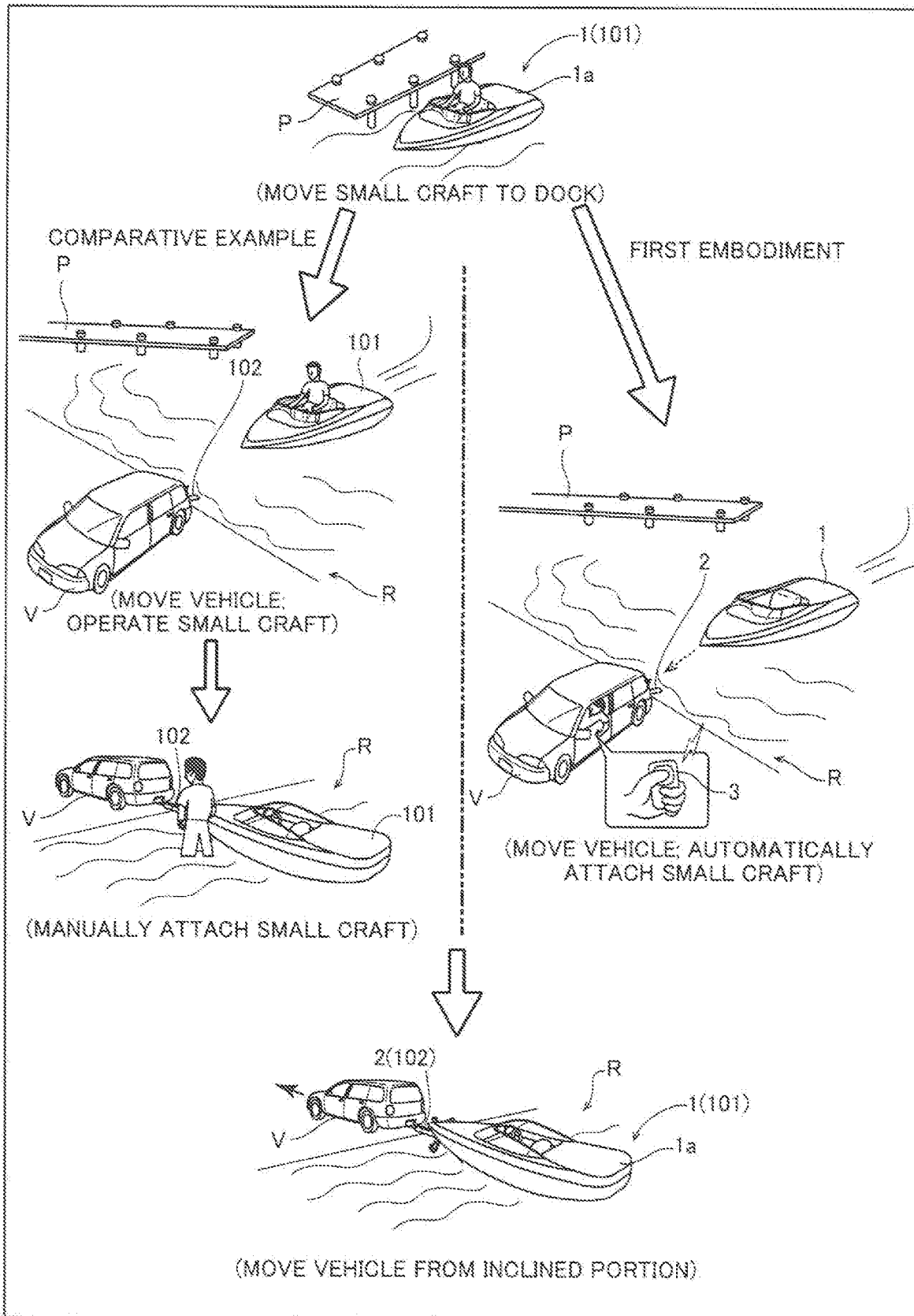
FIG. 2 is a diagram schematically showing operations involved in attachment in the trailing system according to the first embodiment of the present invention.

When the small craft 1 is moved from the water surface (attached) to the trailer 2 on land in the trailing system 100 (in attachment), the user operates the small craft 1 to the dock P and holds the small craft 1 at a fixed point in the vicinity of the dock P, as shown in a right portion of FIG. 2. The user drives the vehicle V and moves the trailer 2 to the inclined portion R. Then, the user operates the remote controller 3 to switch to the automatic trailer mode. In the automatic trailer mode, the small craft 1 is automatically operated toward the trailer 2 from the dock P near which the small craft 1 is automatically held at a fixed point, is automatically moved in a direction (along a dashed arrow in FIG. 2) toward the trailer 2, and is automatically attached to the trailer 2. Then, the automatic trailer mode is terminated, and the user drives the vehicle V and moves the trailer 2 on which the small craft 1 is loaded from the inclined portion R.

In conventional attachment of the small craft 101, on the other hand, the user operates the small craft 101 to the dock P and fixes the small craft 101 to the dock P, as shown in a left portion of FIG. 2. Then, the user drives the vehicle V and moves the trailer 102 to the inclined portion R. Then, the user returns to the dock P and operates the small craft 101 toward the trailer 102. After operating the small craft 101 to a prescribed position in the vicinity of the trailer 102, the user manually attach the small craft 101 to the trailer 102. It is necessary for the user to accurately move the small craft 101 such that the small craft 101 faces the trailer 102, and hence considerable skill is required to operate the small craft 101. Then, the user drives the vehicle V and moves the trailer 102 on which the small craft 101 is loaded from the inclined portion R.

Consequently, in the trailing system 100 according to the first embodiment, the user can promptly and easily attach the small craft 1 to the trailer 2 without considerable skill to operate the small craft 1, as compared with in the conventional attachment of the small craft 101.

(Structure of Trailing System)

Figure 3:
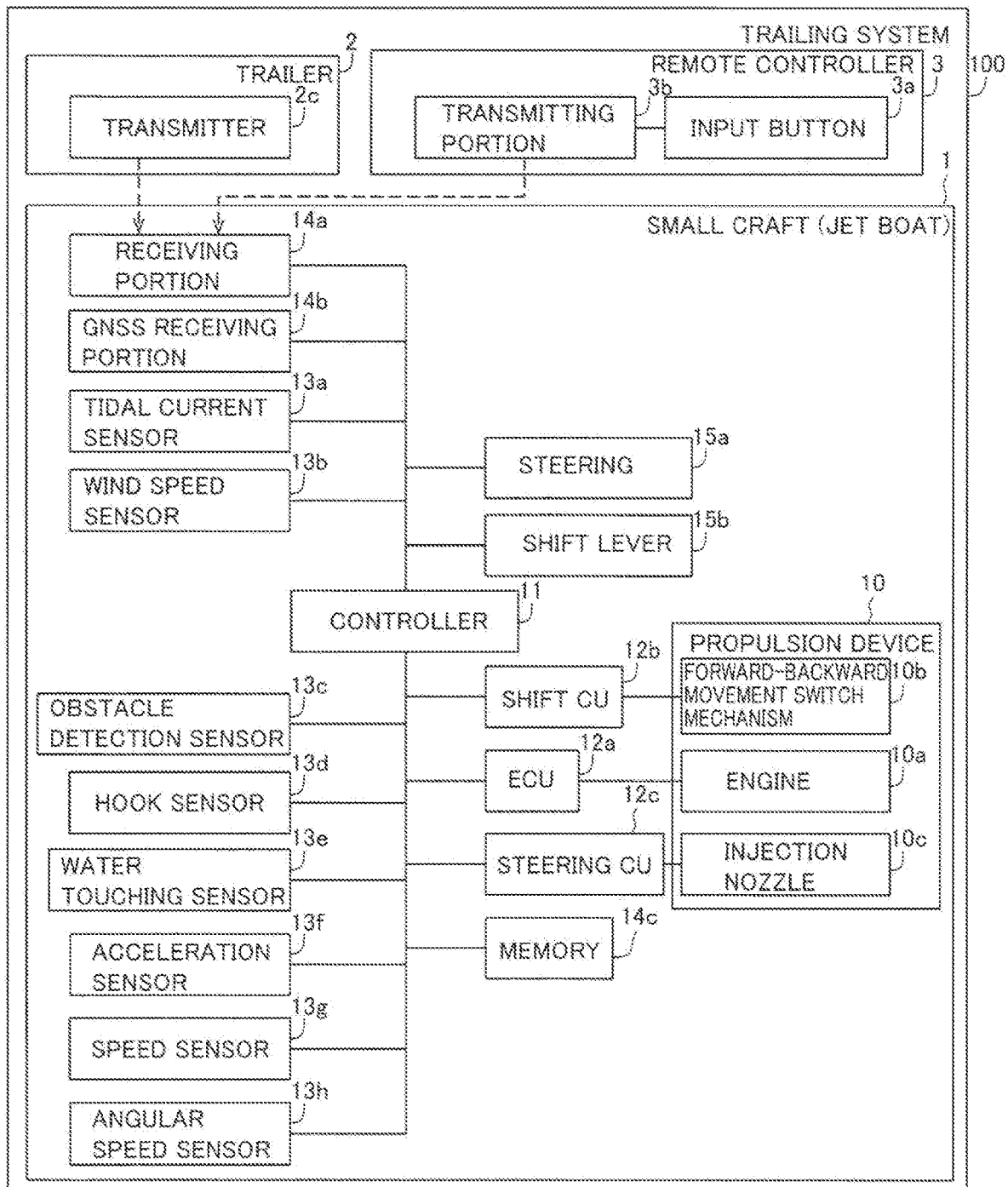
FIG. 3 is a block diagram of the trailing system according to the first embodiment of the present invention.

The structure of the trailing system 100 is now described with reference to FIGS. 1 to 4. The trailing system 100 includes the small craft 1 of less than 20 tons gross tonnage, the trailer 2 on which a craft body 1a of the small craft 1 is loaded, and the remote controller 3 to be operated by the user, as shown in FIG. 3. The remote controller 3 is an example of the "radio remote control" in the present invention.

<Structure of Small Craft>

The small craft 1 includes the craft body 1a (see FIG. 4) and a propulsion device 10 provided in the craft body 1a. This small craft 1 is a so-called jet boat configured to obtain a propulsive force by ejecting a jet of water by the propulsion device 10.

The propulsion device 10 of the small craft 1 includes an engine 10a configured to generate a drive force and a forward-backward movement switch mechanism 10b configured to transmit the drive force of the engine 10a while adjusting the drive force, as shown in FIG. 3. The small craft 1 includes a propeller (not shown) to which the drive force of the engine 10a is transmitted through the forward-backward movement switch mechanism 10b, and the propeller rotates with the drive force to generate a jet of water. The small craft 1 includes an injection nozzle 10c configured to adjust the traveling direction of the small craft 1 by changing the ejection direction of the jet of water generated by the rotation of the propeller.

The small craft 1 includes a controller 11 configured to totally control the small craft 1 including the propulsion device 10 and an ECU (engine control unit) 12a configured to control the engine 10a, a shift CU (control unit) 12b configured to control the forward-backward movement switch mechanism 10b, and a steering CU 12c configured to control the injection nozzle 10c on the basis of instructions from the controller 11. That is, the controller 11 may include non-transitory, tangible elements.

The controller 11 in some embodiments may be implemented as a digital signal processor or dedicated signal processing circuit. In some embodiments, the controller 11 may be a single processor. Such a single processor executes pre-loaded computer program to perform various processes; and may perform the processes simultaneously or sequentially. The controller 11 may include several processors which operate similarly to the processor described above. The controller 11 may include integrated circuit devices and memories mounted on a substrate or substrates. Further, the controller 11 may be part of a computer which has other functional blocks. What is important for the operation of the controller 11 is that it is constructed so as to execute the described operations. It will be understood that other units may be similarly formed to as described above.

The small craft 1 includes a tidal current sensor 13a, a wind speed sensor 13b, an obstacle detection sensor 13c, a hook sensor 13d, a water touching sensor 13e, an acceleration sensor 13f, a speed sensor 13g, and an angular speed sensor 13h as various sensors. The tidal current sensor 13a acquires a tidal current around the craft body 1a (see FIG. 4) as weather information. The wind speed sensor 13b acquires the speed (wind speed) and direction of wind around the craft body 1a as weather information. The obstacle detection sensor 13c includes a radar, a camera, or the like using millimeter waves, ultrasonic waves, lasers, or the like, and detects an obstacle around the craft body 1a. The hook sensor 13d detects that a hook 2d of the trailer 2 is attached to the craft body 1a. The water touching sensor 13e detects that the injection nozzle 10c of the propulsion device 10 is located under water. The acceleration sensor 13f detects the attitude of the craft body 1a by detecting the inclination of the craft body 1a in addition to detecting the acceleration of the craft body 1a. The speed sensor 13g and the angular speed sensor 13h detect the speed (craft body speed) and the angular speed of the craft body 1a, respectively. The obstacle detection sensor 13c and the acceleration sensor 13f are examples of the "obstacle detection portion" and the "attitude detection portion" in the present invention, respectively.

Figure 4:
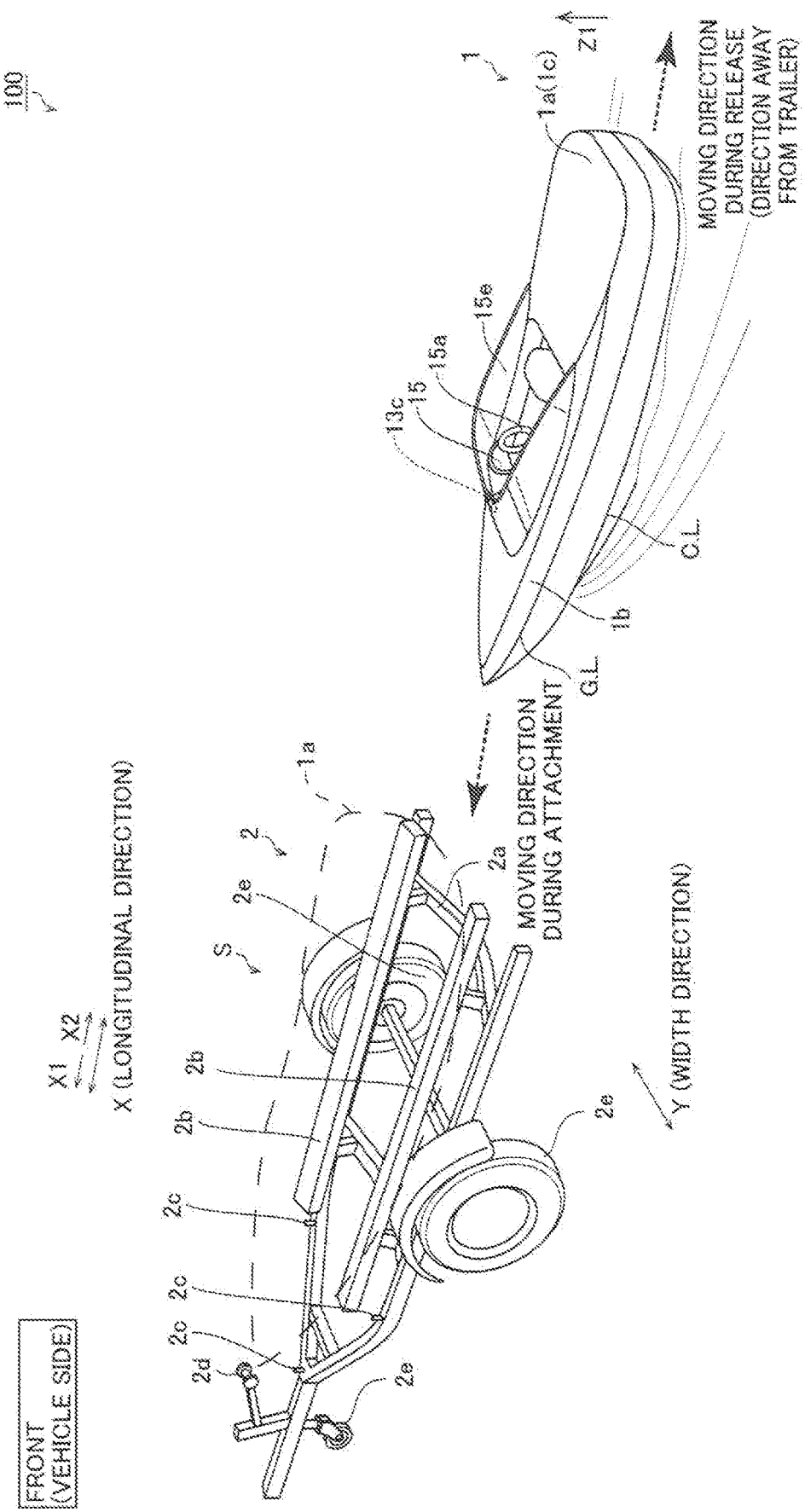
FIG. 4 is a perspective view showing a small craft and a trailer in the trailing system according to the first embodiment of the present invention.

As shown in FIG. 4, the obstacle detection sensor 13c is arranged vertically above (direction Z1) a chine line C.L. of the craft body 1a, and is arranged vertically above a gunwale line G.L. of the craft body 1a. The chine line C.L. of the craft body 1a denotes the position of the craft body 1a at which a draft line is located when the small craft 1 ties up. The gunwale line G.L. of the craft body 1a denotes the position of a boundary between a hull 1b and a deck 1c in the craft body 1a. Furthermore, the obstacle detection sensor 13c is mounted on a position on which water is hardly splashed both when the small craft 1 travels and when the small craft 1 ties up. The obstacle detection sensor 13c is mounted on an inner surface of a windshield 15e of the craft body 1a, for example.

The small craft 1 includes a receiving portion 14a configured to receive a signal transmitted from a transmitter 2c of the trailer 2 and a signal (operation signal) transmitted from a transmitting portion 3b of the remote controller 3 and a GNSS (global navigation satellite system) receiving portion 14b configured to regularly receive a GNSS signal from a GNSS satellite. The small craft 1 includes a memory 14c. In the small craft 1, positional information about the small craft 1 acquired from the GNSS signal by the controller 11 is recorded in the memory 14c during sailing, whereby a sailing track (wake) of the small craft 1 is recorded in the memory 14c. The receiving portion 14a and the GNSS receiving portion 14b are examples of the "position acquisition portion" and the "position detection portion" in the present invention, respectively. The memory 14c is an example of the "first recording portion" in the present invention.

The craft body 1a of the small craft 1 is provided with a console 15 (see FIG. 4) configured to receive operations of the user that operates the small craft 1 and to display the state of the small craft 1, such as the craft body speed. The console 15 is provided with both a steering 15a and a shift lever 15b to be operated by the user. The controller 11 controls the ejection direction of a jet of water ejected from the injection nozzle 10c through the steering CU 12c on the basis of the turning angle of the steering 15a operated by the user. The controller 11 performs control of shifting the forward-backward movement switch mechanism 10b through the shift CU 12b on the basis of the position of the shift lever 15b operated by the user.

<Structure of Trailer>

In the trailer 2, the craft body 1a of the small craft 1 is released toward the back (along arrow X2) in a longitudinal direction (direction X), and the craft body 1a of the small craft 1 is attached from the back to front (along arrow X1) in the longitudinal direction, as shown in FIG. 4. The trailer 2 includes a frame 2a fixed to the vehicle V, a pair of supporting portions 2b provided on the frame 2a, on which the craft body 1a is loaded, three transmitters 2c, the hook 2d, and three wheels 2e configured to move on land. The pair of supporting portions 2b are provided in the vicinity of both ends of the frame 2a in a width direction (direction Y). A position supported by the pair of supporting portions 2b is an attachment position S for the craft body 1a. In FIG. 4, the craft body 1a arranged in the attachment position S is shown by a broken line. The three transmitters 2c are provided in a substantially central portion of a front portion of the frame 2a in the width direction (direction Y) and in both ends of the front portion of the frame 2a in the width direction. In other words, a plurality of (three, for example) transmitters 2c are provided, and the three transmitters 2c are mounted at separate positions of the trailer 2. The hook 2d fixes the craft body 1a of the small craft 1 attached to the attachment position S from the front. The transmitters 2c and the hook 2d are examples of the "signal output portion" and the "fixation portion" in the present invention, respectively.

<Structure of Remote Controller>

The remote controller 3 includes an input button 3a configured to accept operations from the user and the transmitting portion 3b configured to transmit operation information based on the operations of the user, as shown in FIG. 3. The controller 11 of the small craft 1 controls switching to the automatic trailer mode and automatic sailing of the small craft 1 to a position near the remote controller 3 on the basis of the operation information from the remote controller 3.

(Control in Trailing System)

According to the first embodiment, the controller 11 of the small craft 1 is configured to control the propulsion device 10 on the basis of positional information (or "trailer positional information") about the trailer 2 acquired by the receiving portion 14a when the craft body 1a of the small craft 1 is released from and attached to the trailer 2 (during automatic trailing) in the trailing system 100. Specifically, the controller 11 acquires a distance from each of the transmitters 2c to the small craft 1 (receiving portion 14a) on the basis of the intensity of a prescribed signal (the positional information about the trailer 2) received through the receiving portion 14a when the craft body 1a of the small craft 1 is released from and attached to the trailer 2. The controller 11 is configured to control the propulsion device 10 by changing the engine rotational speed of the engine 10a of the propulsion device 10, switching the forward-backward movement switch mechanism 10b, changing the angle of the injection nozzle 10c, etc. at least on the basis of the acquired distance from the small craft 1 to the trailer 2. Detailed control performed by the controller 11 is described later in a control flow.

<Release Operations>

Figure 5:
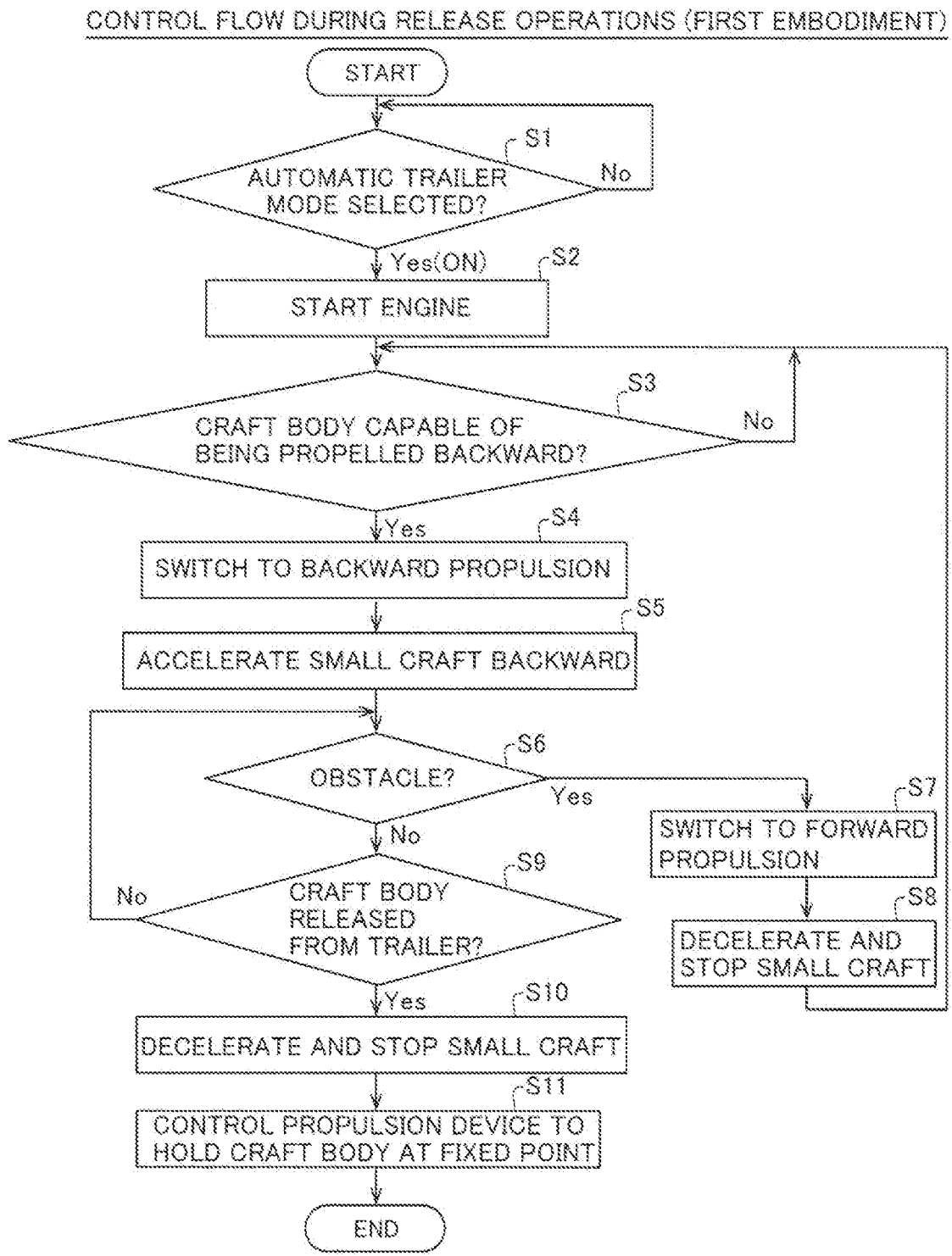
FIG. 5 is a flowchart showing small craft control involved in release in the trailing system according to the first embodiment of the present invention.

Operations for releasing the small craft 1 in the trailing system 100 according to the first embodiment are now described mainly with reference to a conceptual diagram shown in FIG. 1 and a flowchart shown in FIG. 5. The following control (steps) in the small craft 1 is performed by the controller 11 (see FIG. 3).

As a first step of the operations for releasing the small craft 1, the user drives the vehicle V and moves the trailer 2 on which the small craft 1 is loaded in the attachment position S (see FIG. 4) to the inclined portion R, as shown in FIG. 1. Then, the user operates the input button 3a of the remote controller 3 on hand to select the automatic trailer mode.

The controller 11 of the small craft 1 determines whether or not the automatic trailer mode has been selected and repeats this determination until the automatic trailer mode is selected at a step S1 in FIG. 5. When determining that the automatic trailer mode has been selected, the controller 11 starts the engine 10a of the propulsion device 10 at a step S2.

The controller 11 checks the circumstances of the small craft 1 in order to determine whether or not the craft body 1a of the small craft 1 is capable of being propelled backward from the attachment position S (propelled in a direction away from the vehicle V) at a step S3. Specifically, the controller 11 determines whether or not there is an obstacle behind and around the craft body 1a on the basis of a detection result of the obstacle detection sensor 13c. Furthermore, the controller 11 determines whether or not the hook 2d configured to fix the craft body 1a has been removed (the fixation state of the hook 2d) on the basis of a detection result of the hook sensor 13d. The hook 2d may be configured to be automatically removed when the automatic trailer mode is selected or may be configured to be manually removed by the user. The controller 11 determines whether or not the injection nozzle 10c of the propulsion device 10 is located in water below the water surface (the position of the propulsion device 10 in a vertical direction from the water surface) on the basis of a detection result of the water touching sensor 13e. When determining that there is an obstacle behind and around the craft body 1a and determining that the hook 2d is not removed or the injection nozzle 10c is not located under water, the controller 11 returns to the step S3 and checks the circumstances of the small craft 1 again. When determining that there is no obstacle behind and around the craft body 1a, determining that the hook 2d is removed, and determining that the injection nozzle 10c is located under water, on the other hand, the controller 11 determines that the craft body 1a is capable of being propelled backward.

When determining that the craft body 1a is capable of being propelled backward, the controller 11 controls the forward-backward movement switch mechanism 10b to switch to backward propulsion of the craft body 1a at a step S4. At a step S5, the engine 10a is driven, and the small craft 1 is accelerated backward. At this time, backward propulsion of the craft body 1a in a direction away from the attachment position S of the trailer 2 is feedback-controlled on the basis of the distance (or "distance information") from the craft body 1a to the trailer 2. At a step S6, the controller 11 determines whether or not an obstacle has appeared behind and around the craft body 1a on the basis of the detection result of the obstacle detection sensor 13c. When determining that an obstacle has appeared, the controller 11 controls the forward-backward movement switch mechanism 10b to switch to forward propulsion of the craft body 1a at a step S7. At a step S8, the controller 11 controls the propulsion device 10 to decelerate and stop the small craft 1. Then, the controller 11 returns to the step S3 and checks the circumstances of the small craft 1 again.

When determining that no obstacle has appeared, the controller 11 determines whether or not the craft body 1a of the small craft 1 has been released from the trailer 2 by determining whether or not the craft body 1a of the small craft 1 has been moved to a position far enough away from the trailer 2 at a step S9. Specifically, the controller 11 determines whether or not the inclination of the craft body 1a has been sufficiently reduced by moving the craft body 1a to the water surface on the basis of a detection result of the acceleration sensor 13f. Furthermore, the controller 11 acquires the distance from the central transmitter 2c to the craft body 1a on the basis of the intensity of the prescribed signal (the positional information about the trailer 2) received through the receiving portion 14a. Then, the controller 11 determines whether or not the distance from the central transmitter 2c to the craft body 1a exceeds a prescribed threshold. When determining that the inclination of the craft body 1a has not been sufficiently reduced or determining that the distance from the central transmitter 2c to the craft body 1a does not exceed the prescribed threshold, the controller 11 determines that the craft body 1a has not been released from the trailer 2 and returns to the step S6. When determining that the inclination of the craft body 1a has been sufficiently reduced and determining that the distance from the central transmitter 2c to the craft body 1a exceeds the prescribed threshold, on the other hand, the controller 11 determines that the craft body 1a has been released from the trailer 2.

When determining that the craft body 1a has been released from the trailer 2, the controller 11 controls the propulsion device 10 to decelerate and stop the small craft 1 at a step S10. At a step S11, the controller 11 controls the propulsion device 10 to hold the craft body 1a at a fixed point in a prescribed release position where the small craft 1 is separated from the attachment position S. Specifically, the controller 11 controls the propulsion device 10 not to move the craft body 1a from the positional information about the craft body 1a (positional information about the release position) acquired through the GNSS receiving portion 14b. Thus, the controller 11 terminates the control (automatic trailer mode) in the small craft 1 during the operations for releasing the small craft 1. After this, the user may operate the remote controller 3 to cause the small craft 1 to automatically sail to the dock P or the like where the user is or may maintain holding of the small craft 1 at a fixed point until the user gets into the small craft 1.

<Attachment Operations>

Figure 6:
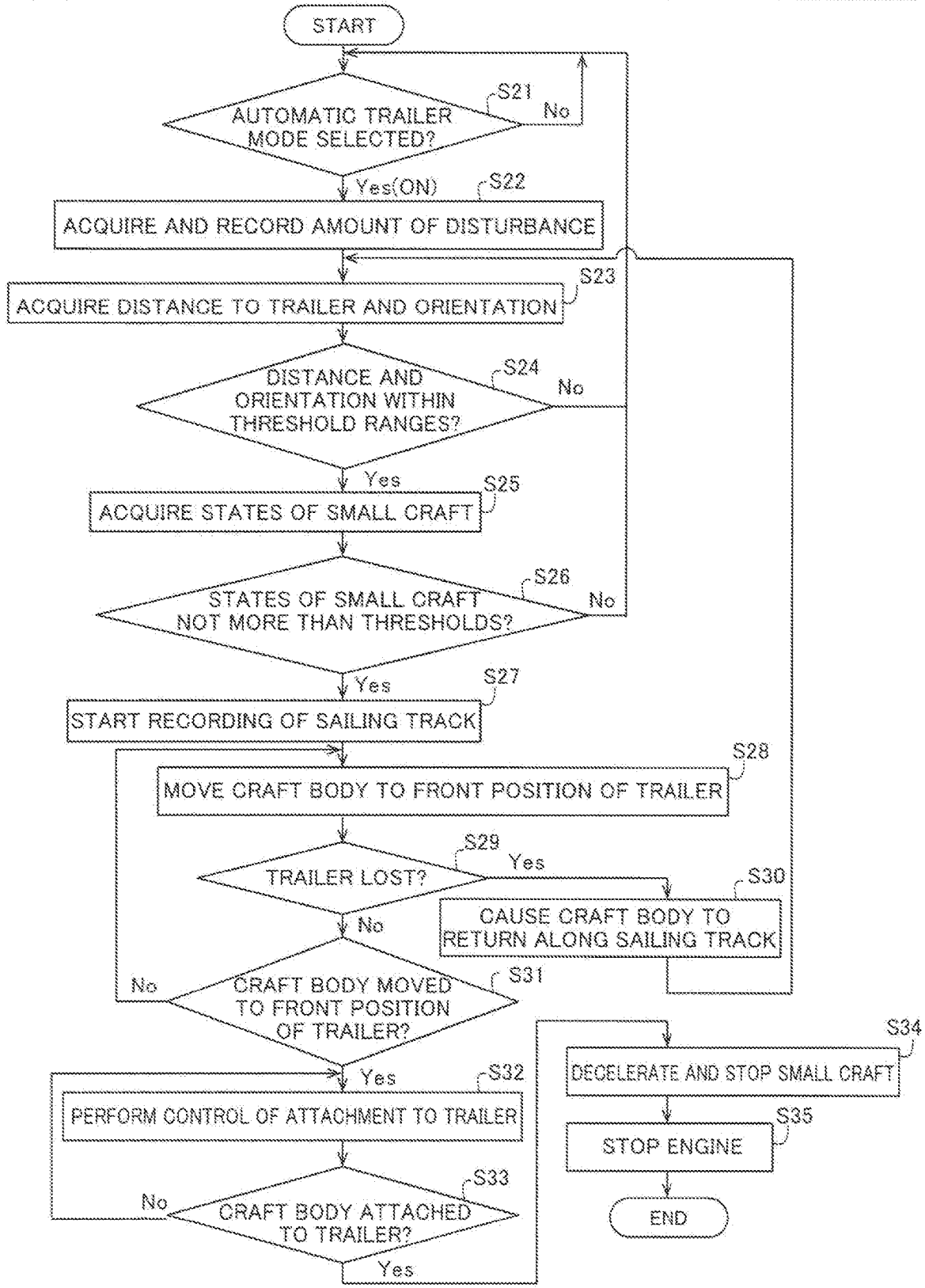
FIG. 6 is a flowchart showing small craft control involved in attachment in a trailing system according to each of the first embodiment and a fifth embodiment of the present invention.
Figure 7:
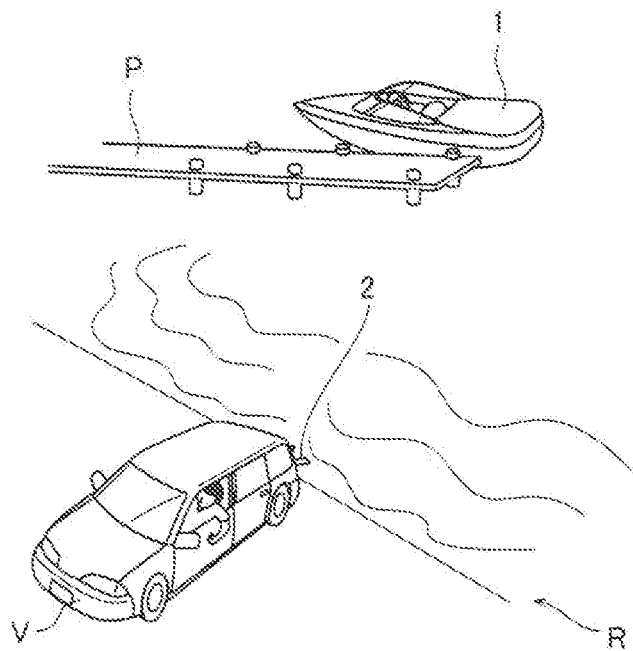
FIG. 7 schematically illustrates the case where the orientation of the small craft in the trailing system according to the first embodiment of the present invention is not within a threshold range.
Figure 8:
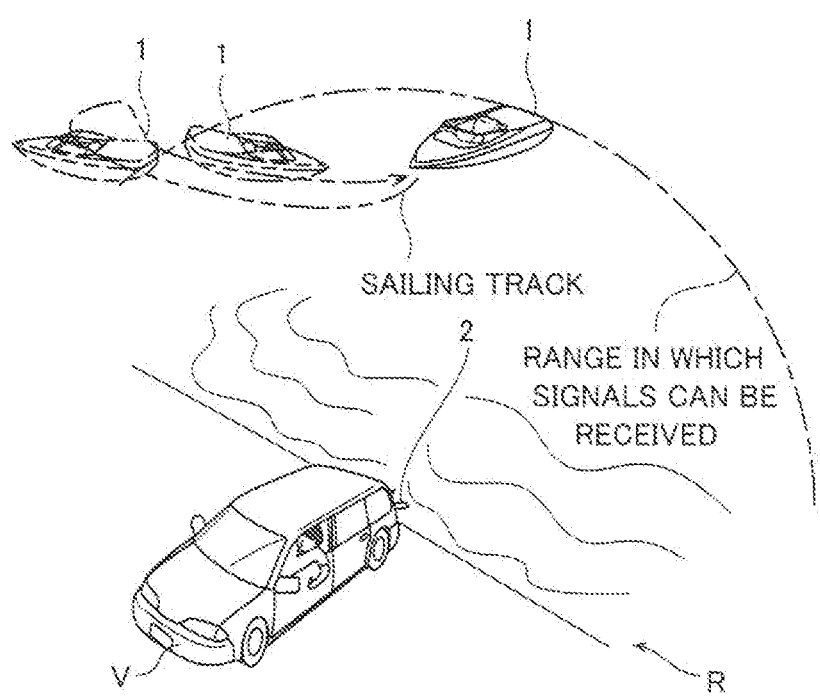
FIG. 8 schematically illustrates the case where the small craft returns along a sailing track in the trailing system according to the first embodiment of the present invention.

Operations for attaching the small craft 1 in the trailing system 100 according to the first embodiment are now described mainly with reference to a conceptual diagram shown in FIG. 2, a flowchart shown in FIG. 6, and FIGS. 7 and 8. The following control (steps) in the small craft 1 is performed by the controller 11.

As a first step of the operations for attaching the small craft 1, the user operates the small craft 1 to the dock P and holds the small craft 1 at a fixed point in the vicinity of the dock P, as shown in FIG. 2. Then, the user drives the vehicle V and moves the trailer 2 to the inclined portion R. Then, the user operates the input button 3a of the remote controller 3 on hand to select the automatic trailer mode.

The controller 11 of the small craft 1 determines whether or not the automatic trailer mode has been selected at a step S21 in FIG. 6 and repeats this determination until the automatic trailer mode is selected. When determining that the automatic trailer mode has been selected, the controller 11 acquires the amount of disturbance based on weather conditions and records the same in the memory 14c at a step S22. Specifically, the controller 11 acquires a tidal current around the craft body 1a of the small craft 1 as weather information on the basis of a detection result of the tidal current sensor 13a and acquires the speed (wind speed) and direction of wind around the craft body 1a as weather information on the basis of a detection result of the wind speed sensor 13b. Then, the controller 11 records the acquired weather information as the amount of disturbance based on weather conditions in control of the propulsion device 10 in the memory 14c.

At a step S23, the controller 11 acquires the distance from the trailer 2 to the craft body 1a and the orientation of the craft body 1a with respect to the trailer 2 on the basis of the intensity and direction of the signal received through the receiving portion 14a from the central transmitter 2c. At a step S24, the controller 11 determines whether or not the acquired distance and orientation are within respective prescribed threshold ranges. When the acquired distance is not within the prescribed threshold range as in the case where the craft body 1a is located too close to or too far from the trailer 2, or the acquired orientation is not within the prescribed threshold range, there is a possibility of not being capable of properly shifting to docking. Thus, the controller 11 does not turn on the automatic trailer mode while holding the small body 1 at a fixed point, and returns to the step 21.

When the bow of the small craft 1 is not directed to the location of the vehicle V and the trailer 2 and the small craft 1 is held at a fixed point as in the case shown in FIG. 7, for example, the controller 11 determines that the acquired orientation is not within the prescribed threshold range and does not turn on the automatic trailer mode while holding the small craft 1 at a fixed point.

When determining that the distance and the orientation are within the respective prescribed threshold ranges, the controller 11 acquires the states of the small craft 1 at a step S25 in FIG. 6. Specifically, the controller 11 acquires the rotational speed of the engine, the acceleration of the craft body 1a, the speed of the craft body 1a, and the angular speed of the craft body 1a (the states of the small craft 1) from the ECU 12a, the acceleration sensor 13f, the speed sensor 13g, and the angular speed sensor 13h, respectively. At a step S26, the controller 11 determines whether or not the speed of the craft body 1a, the rotational speed of the engine, the acceleration of the craft body 1a, and the angular speed of the craft body 1a (the states of the small craft 1) are not more than respective prescribed thresholds. When the speed of the craft body 1a, the rotational speed of the engine, the acceleration of the craft body 1a, or the angular speed of the craft body 1a exceeds the prescribed threshold, there is a possibility of not properly performing feedback-control. Thus, the controller 11 does not turn on the automatic trailer mode while holding the small craft 1 at a fixed point and returns to the step S21.

When the speed of the craft body 1a, the rotational speed of the engine, the acceleration of the craft body 1a, and the angular speed of the craft body 1a (the states of the small craft 1) are not more than the respective prescribed thresholds, the controller 11 determines that the small craft 1 can properly shift to docking and starts recording of the positional information about the craft body 1a acquired through the GNSS receiving portion 14b at a step S27. At a step S28, the controller 11 feedback-controls the propulsion device 10 to move the craft body 1a of the small craft 1 to the front position of the trailer 2 in order for the small craft 1 to shift to docking. At this time, the controller 11 controls the propulsion device 10, taking the amount of disturbance acquired at the step S22 into consideration.

At a step S29, the controller 11 determines whether or not the small craft 1 is deviated due to unexpected big waves, strong wind, etc. so that it is impossible to receive the signals from the transmitters 2c of the trailer 2 and the trailer 2 is lost. When losing the trailer 2, the controller 11 controls the propulsion device 10 to cause the craft body 1a to return along the sailing track stored in the memory 14c at a step S30. Thus, the craft body 1a returns to a position from which the craft body 1a is movable to the front position of the trailer 2. Then, the controller 11 returns to the step S23 and determines again whether or not the small craft 1 can properly shift to docking.

When the sailing track (a two-dot chain line in FIG. 8) of the small craft 1 is deviated from a range (a one-dot chain line in FIG. 8) in which the signals from the transmitters 2c of the trailer 2 are capable of being received as in the case shown in FIG. 8, for example, the craft body 1a returns to the position from which the craft body 1a is movable to the front position of the trailer 2 along the sailing track.

When not losing the trailer 2, the controller 11 determines whether or not the craft body 1a has been moved to the front position of the trailer 2 on the basis of the distance from the trailer 2 to the craft body 1a and the orientation of the small craft 1 acquired on the basis of the intensity and direction of the signal from the central transmitter 2c, respectively at a step S31. When determining that the craft body 1a has not been moved to the front position of the trailer 2, the controller 11 returns to the step S28. When determining that the craft body 1a has been moved to the front position of the trailer 2, the controller 11 shifts the small craft 1 to docking and performs control of attachment to the trailer 2 at a step S32. Specifically, the controller 11 detects the deviation of the small craft 1 in the width direction with respect to the trailer 2 acquired from the signals transmitted from a pair of transmitters 2c arranged on both ends of the trailer 2 in the width direction in addition to the distance from the trailer 2 to the craft body 1a and the orientation of the small craft 1 acquired from the signal (the positional information about the trailer 2) transmitted from the central transmitter 2c, and feedback-controls the propulsion device 10 to move the craft body 1a toward the attachment position S of the trailer 2, taking the distance, the orientation, and the deviation in the width direction into consideration.

Specifically, as feedback-control, the controller 11 first increases the rotational speed of the engine to increase the drive force in order for the small craft 1 to ride onto the trailer 2. Then, the controller 11 reduces the rotational speed of the engine when determining that the craft body 1a is located sufficiently above the water surface on the basis of the signals from the transmitters 2c and the detection result of the water touching sensor 13e. When determining that the craft body 1a has dropped to the water surface, on the other hand, the controller 11 increases the rotational speed of the engine.

At a step S33, the controller 11 determines whether or not the craft body 1a of the small craft 1 has been attached to the attachment position S of the trailer 2. Specifically, the controller 11 determines whether or not the inclination of the craft body 1a has entered a prescribed threshold range by movement of the craft body 1a to the attachment position S on the basis of the detection result of the acceleration sensor 13f. Furthermore, the controller 11 determines whether or not the craft body 1a is located in the attachment position S of the trailer 2 on the basis of the position of the craft body 1a with respect to the trailer 2 acquired from the signals transmitted from the three transmitters 2c. When determining that the inclination of the craft body 1a has not entered the prescribed threshold range or that the craft body 1a is not located in the attachment position S of the trailer 2, the controller 11 determines that the craft body 1a has not been attached to the trailer 2 and returns to the step S32.

When determining that the inclination of the craft body 1a has entered the prescribed threshold range and that the craft body 1a is located in the attachment position S of the trailer 2, the controller 11 determines that the craft body 1a has been attached to the trailer 2. At a step S34, the controller 11 controls the propulsion device 10 to decelerate and stop the small craft 1. At a step S35, the engine 10a is stopped. Thus, the controller 11 terminates the control (automatic trailer mode) in the small craft 1 during the operations for attaching the small craft 1. Then, the user attaches the hook 2d of the trailer 2 to the craft body 1a and fixes the craft body 1a to the trailer 2. Finally, the user drives the vehicle V and moves the trailer 2 on which the small craft 1 is loaded from the inclined portion R.

Effects of First Embodiment

According to the first embodiment, the following effects are obtained.

According to the first embodiment, as hereinabove described, the small craft 1 is provided with the controller 11 configured to control the propulsion device 10 on the basis of the positional information about the trailer 2 acquired by the receiving portion 14a during the operations for releasing the craft body 1a from the trailer 2 and the operations for attaching the craft body 1a to the trailer 2. Thus, the controller 11 can properly control the propulsion device 10 according to the position of the trailer 2, and hence the user can release the small craft 1 from the trailer 2 and attach the small craft 1 to the trailer 2 without advanced (considerable) skill to operate the small craft 1. Consequently, the small craft 1 can be easily attached and released.

According to the first embodiment, the controller 11 is configured to acquire the distance from the craft body 1a to the trailer 2 on the basis of the positional information about the trailer 2 acquired by the receiving portion 14a and to control the propulsion device 10 on the basis of the acquired distance. Thus, the controller 11 can properly control the propulsion device 10 according to the distance from the craft body 1a to the trailer 2, and hence the user can reliably release the small craft 1 from the trailer 2 and attach the small craft 1 to the trailer 2 without the advanced skill to operate the small craft 1.

According to the first embodiment, the controller 11 is configured to acquire the orientation of the craft body 1a with respect to the trailer 2 in addition to the distance on the basis of the positional information about the trailer 2 acquired by the receiving portion 14a and to control the propulsion device 10 to move the craft body 1a to the attachment position S of the trailer 2 for the craft body 1a on the basis of the distance and the orientation. Thus, the controller 11 can more properly control the propulsion device 10 according to the orientation of the craft body 1a with respect to the trailer 2 in addition to the distance from the craft body 1a to the trailer 2, and hence the user can more reliably attach the small craft 1 to the trailer 2 without the advanced skill to operate the small craft 1.

According to the first embodiment, the controller 11 is configured to record the sailing track of the craft body 1a in the memory 14c on the basis of the positional information about the craft body 1a detected by the GNSS receiving portion 14b when moving the craft body 1a to the attachment position S. Furthermore, the controller 11 is configured to control the propulsion device 10 to cause the craft body 1a to return to the position from which the craft body 1a is movable to the attachment position S (the position from which the craft body 1a is movable to the front position of the trailer 2) along the sailing track of the craft body 1a recorded in the memory 14c when failing to move the craft body 1a to the attachment position S. Thus, the small craft 1 can automatically return to the position from which the craft body 1a is movable to the attachment position S along the sailing track of the craft body 1a even when the craft body 1a is unintentionally moved due to disturbance factors unique to the small craft 1, such as waves and wind, and fails to be moved to the attachment position S. Thus, the user can still more reliably attach the small craft 1 to the trailer 2 without the advanced skill to operate the small craft 1 even when the disturbance factors occur.

According to the first embodiment, the controller 11 is configured to feedback-control the propulsion device 10 to move the craft body 1a to the front position and the attachment position S of the trailer 2 when the speed of the craft body 1a, the rotational speed of the engine 10a, the acceleration of the craft body 1a, and the angular speed of the craft body 1a are not more than the respective prescribed thresholds. Thus, improper control of the propulsion device 10 by the controller 11 resulting from the high speed of the craft body 1a, the high rotational speed of the engine 10a, the high acceleration of the craft body 1a, and the high angular speed of the craft body 1a can be significantly reduced or prevented.

According to the first embodiment, the controller 11 is configured to determine whether or not the craft body 1a has been attached to the attachment position S on the basis of the positional information about the trailer 2 acquired by the receiving portion 14a. Thus, the controller 11 not only controls the propulsion device 10 but also determines whether or not the craft body 1a has been attached to the attachment position S on the basis of the positional information about the trailer 2, and hence user's labor of attaching the small craft 1 can be reduced.

According to the first embodiment, the controller 11 is configured to control the propulsion device 10 on the basis of the positional information about the trailer 2 acquired by the receiving portion 14a when receiving the operation signal from the remote controller 3. Thus, the user can instruct the small craft 1 to be released from the trailer 2 and be attached to the trailer 2 even from a position away from the small craft 1 by the remote controller 3 on hand. Furthermore, the user simply operates the remote controller 3, whereby the controller 11 automatically releases the small craft 1 from the trailer 2 and attaches the small craft 1 to the trailer 2, and hence the convenience of the user can be improved.

According to the first embodiment, the controller 11 is configured to control the propulsion device 10 on the basis of the attitude of the craft body 1a acquired by the acceleration sensor 13f in addition to the positional information about the trailer 2 acquired by the receiving portion 14a. Thus, the controller 11 can properly control the propulsion device 10 according to not only the position of the trailer 2 but also the attitude of the craft body 1a, and hence the user can even more reliably release the small craft 1 from the trailer 2 and attach the small craft 1 to the trailer 2 without the advanced skill to operate the small craft 1.

According to the first embodiment, the controller 11 is configured to control the propulsion device 10 on the basis of the weather information (the tidal current, the wind speed, and the direction of the wind around the small craft 1) in addition to the positional information about the trailer 2 acquired by the receiving portion 14a. Thus, the controller 11 can more properly control the propulsion device 10 in consideration of not only the positional information about the trailer 2 but also weather conditions that are the disturbance factors unique to the small craft 1, such as the waves and wind.

According to the first embodiment, the controller 11 is configured to control the propulsion device 10 to propel the craft body 1a backward in the direction away from the attachment position S of the trailer 2 for the craft body 1a on the basis of the positional information about the trailer 2 acquired by the receiving portion 14a. Thus, the craft body 1a can be properly propelled backward according to the position of the trailer 2, and hence the user can easily and reliably release the small craft 1 from the trailer 2 without the advanced skill to operate the small craft 1.

According to the first embodiment, the controller 11 is configured to control the propulsion device 10 to hold the craft body 1a at a fixed point away from the attachment position S. Thus, the user can move the vehicle V towing the trailer 2 while the small craft 1 is held at a fixed point, and hence user's labor of fixing the small craft 1 to the dock P or the like can be reduced.

According to the first embodiment, the controller 11 is configured to determine whether or not to propel the craft body 1a backward in the direction away from the attachment position S on the basis of the fixation state of the hook 2d configured to fix the craft body 1a to the trailer 2, the position of the propulsion device 10 in the vertical direction from the water surface, and the presence or absence of the obstacle around the craft body 1a. Thus, the controller 11 previously determines whether or not the small craft 1 can be propelled backward from the attachment position S, whereby the small craft 1 can be accurately propelled backward.

According to the first embodiment, the controller 11 is configured to control the propulsion device 10 to stop propelling the craft body 1a backward when determining that the obstacle has appeared on the basis of the detection result of the obstacle detection sensor 13c during backward propulsion of the craft body 1a in the direction away from the attachment position S. Thus, the controller 11 determines whether or not the small craft 1 can be propelled backward from the attachment position S on the basis of whether or not the obstacle has appeared even during backward propulsion of the craft body 1a, and hence the small craft 1 can be more accurately propelled backward.

According to the first embodiment, the receiving portion 14a of the small craft 1 is configured to receive the signals transmitted from the transmitters 2c of the trailer 2. Thus, the positional information about the trailer 2 can be easily acquired from the signals transmitted from the transmitters 2c of the trailer 2.

According to the first embodiment, the transmitters 2c configured to output the signals to the trailer 2 are provided, whereby the position of the trailer 2 can be clearly recognized in the small craft 1.

According to the first embodiment, the plurality of (three, for example) transmitters 2c are provided in the trailer 2 so that the small craft 1 can more reliably acquire the position of the trailer 2 using the signals from the plurality of transmitters 2c mounted on the trailer. Thus, the small craft 1 can be more accurately released from the trailer 2 and attached to the trailer 2.

According to the first embodiment, the obstacle detection sensor 13c is arranged vertically above the chine line C.L. of the craft body 1a. Thus, it is possible to restrain the obstacle detection sensor 13c from being located under water, and hence it is possible to restrain the obstacle detection sensor 13c from failing to sufficiently detect the obstacle.

According to the first embodiment, the obstacle detection sensor 13c is arranged vertically above the gunwale line G.L. of the craft body 1a. Thus, it is possible to restrain the craft body 1a from hindering detection by the obstacle detection sensor 13c, and hence the obstacle detection sensor 13c can more reliably detect the obstacle.

Second Embodiment

A second embodiment of the present invention is now described with reference to FIGS. 9 to 12. In a trailing system 200 according to the second embodiment, positional information about a trailer 202 is acquired by a stereo camera 214a of a small craft 201, unlike the trailing system 100 according to the aforementioned first embodiment in which the signals from the trailer 2 are acquired as the positional information about the trailer 2 by the small craft 1. Portions similar to those of the trailing system 100 according to the first embodiment are denoted by the same reference numerals, to omit the description.

(Structure of Trailing System)

Figure 9:
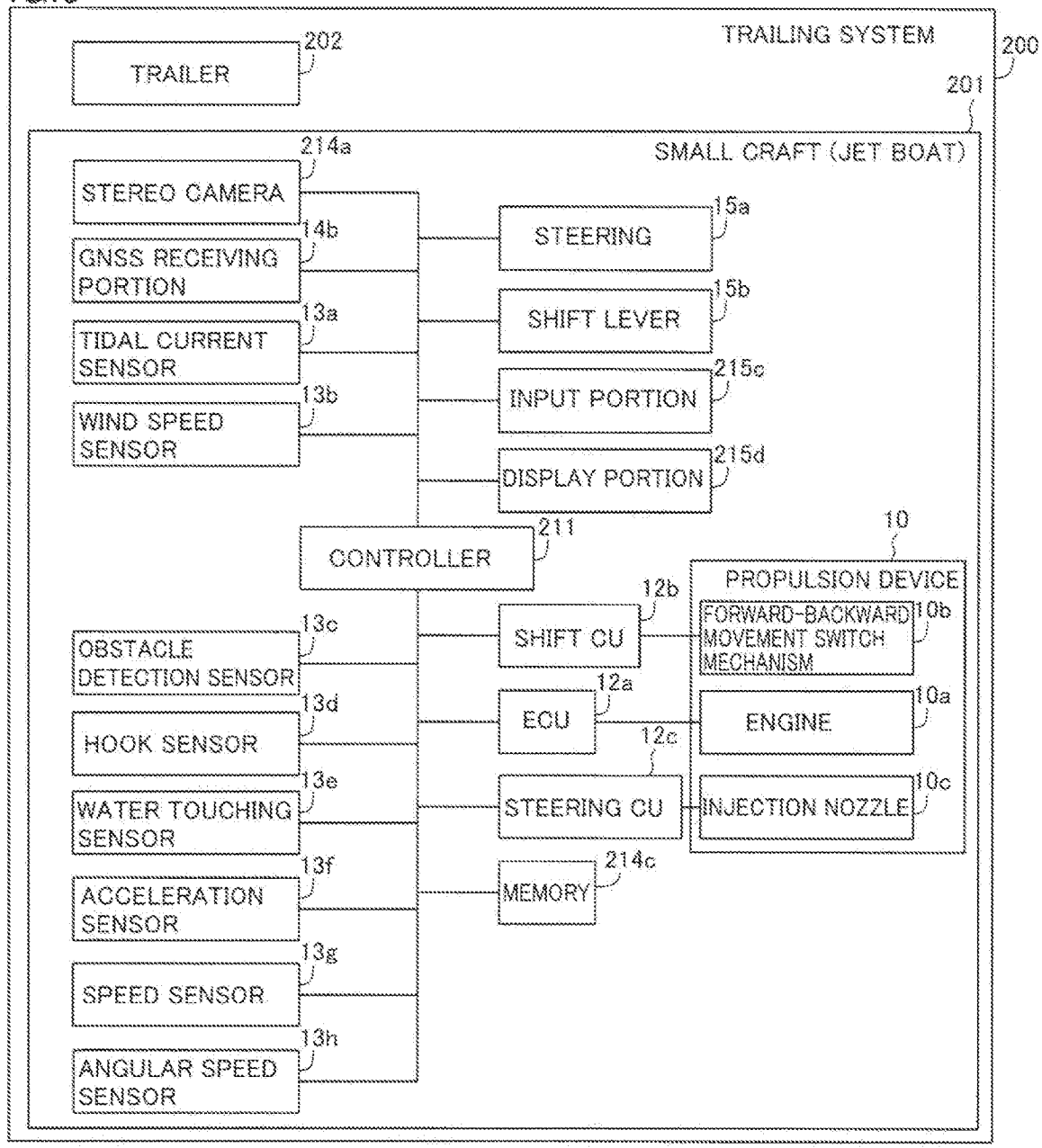
FIG. 9 is a block diagram of a trailing system according to a second embodiment of the present invention.

The trailing system 200 according to the second embodiment includes the small craft 201 and the trailer 202 provided with no transmitter unlike the trailer 2 according to the aforementioned first embodiment, as shown in FIG. 9. This trailing system 200 includes no remote controller unlike the trailing system 100 according to the aforementioned first embodiment, and the small craft 201 is automatically attached and released while a user is on the small craft 1.

<Structure of Small Craft>

The small craft 201 includes a controller 211 configured to totally control the small craft 201 and the stereo camera 214a configured to acquire the positional information about the trailer 202 by imaging the trailer 202. The stereo camera 214a includes a pair of cameras separated by a prescribed distance and forms a three-dimensional image by synthesizing images taken by the pair of cameras. The small craft 201 acquires a distance from the trailer 202 to a craft body 1a and the orientation of the craft body 1a with respect to the trailer 202 as the positional information from the prepared three-dimensional image. The stereo camera 214a is an example of the "position acquisition portion" or the "target recognizer" in the present invention.

The small craft 201 includes a memory 214c. The memory 214c can record the three-dimensional image formed by the stereo camera 214a in addition to a sailing track (wake) of the small craft 201. The memory 214c is an example of the "first recording portion" or the "second recording portion" in the present invention.

Figure 10:
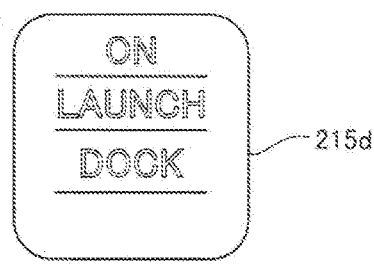
FIG. 10 is a diagram showing a display portion of a small craft in the trailing system according to the second embodiment of the present invention.

The small craft 201 is provided with an input portion 215c configured to accept operations from the user on the small craft 201 and a display portion 215d. The display portion 215d can display "ON", "LAUNCH", and "DOCK", as shown in FIG. 10. "ON" is displayed when an automatic trailer mode is selected. "LAUNCH" is displayed when automatic release operation is performed and the small craft 201 can be automatically released. "DOCK" is displayed when automatic attachment operation is performed and the small craft 201 can be automatically attached. "LAUNCH" and "DOCK" illuminate green when the small craft 201 can be automatically released and can be automatically attached, respectively, whereby the user is notified accordingly. "LAUNCH" and "DOCK" illuminate red when automatic release operation and automatic attachment operation are performed, respectively, whereby the user is notified accordingly. The remaining structure of the trailing system 200 according to the second embodiment is similar to that of the trailing system 100 according to the aforementioned first embodiment.

(Control in Small Craft)

According to the second embodiment, in the trailing system 200, a controller 211 of the small craft 201 is configured to control a propulsion device 10 on the basis of the positional information about the trailer 202 acquired by the stereo camera 214a when the craft body 1a of the small craft 201 is released from the trailer 202 and is attached to the trailer 202. Control in the controller 211 is described in detail with reference to a control flow described later.

<Release Operations>

Figure 11:
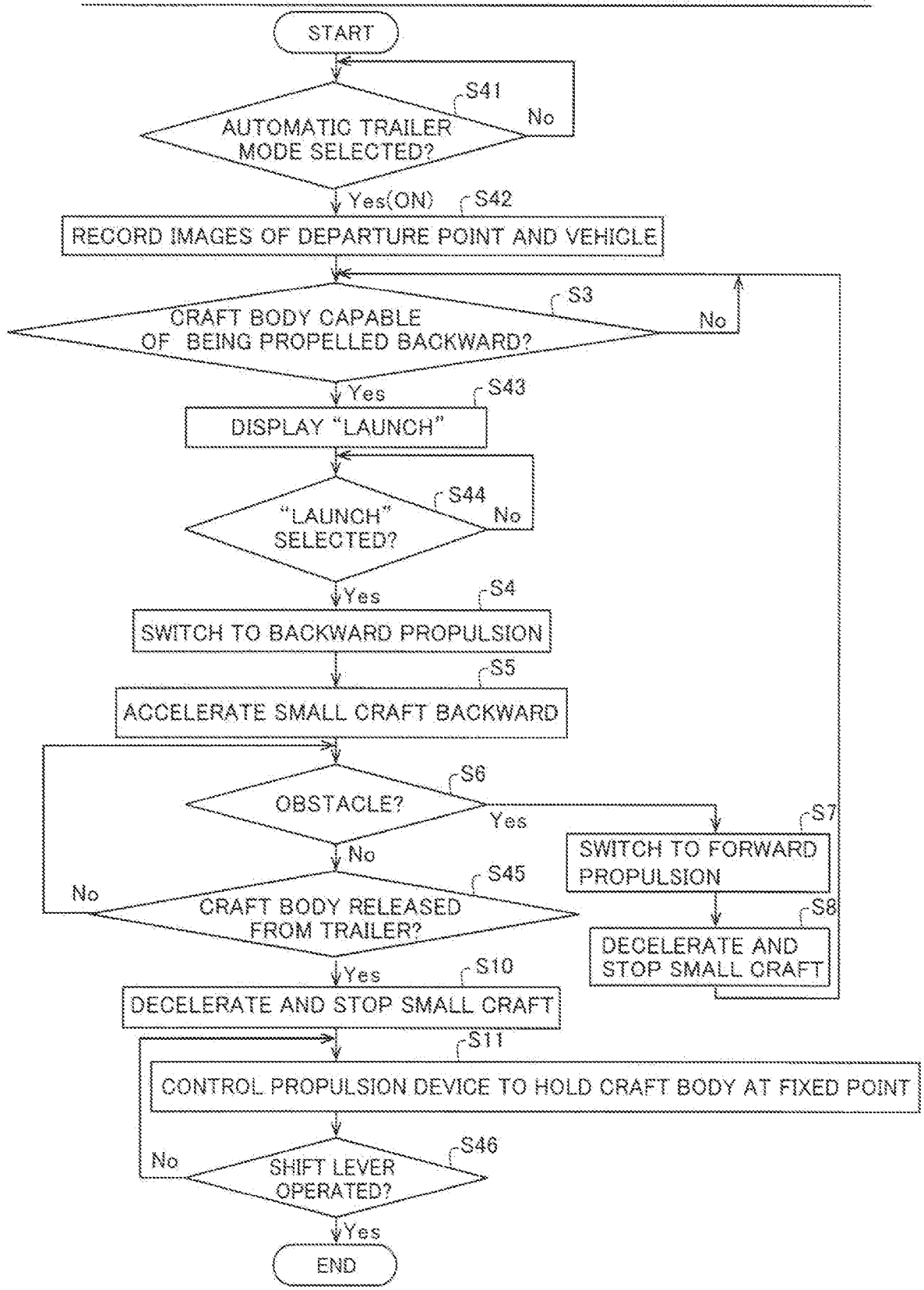
FIG. 11 is a flowchart showing small craft control involved in release in the trailing system according to the second embodiment of the present invention.

Operations for releasing the small craft 201 in the trailing system 200 according to the second embodiment are now described mainly with reference to a flowchart shown in FIG. 11. The following control (steps) in the small craft 201 is performed by the controller 211 (see FIG. 9). Steps similar to those of the control flow for the release operations according to the first embodiment shown in FIG. 5 are denoted by the same reference numerals, to omit the description.

As a first step of the operations for releasing the small craft 201, the user drives a vehicle and moves the trailer 202 on which the small craft 201 is loaded to an inclined portion, similarly to the aforementioned first embodiment. Then, the user gets into the small craft 201 and starts an engine 10a. Then, the user selects the automatic trailer mode through the input portion 215c of the small craft 201.

The controller 211 of the small craft 201 determines whether or not the automatic trailer mode has been selected and repeats this determination until the automatic trailer mode is selected at a step S41 in FIG. 11. When determining that the automatic trailer mode has been selected, the controller 211 controls the stereo camera 214a to image a departure point and the vehicle towing the trailer 202 and records the images in the memory 214c at a step S42.

At a step S3, the controller 211 determines whether or not the craft body 1a of the small craft 201 is capable of being propelled backward from an attachment position, similarly to the aforementioned first embodiment. When determining that the craft body 1a is capable of being propelled backward, the controller 211 illuminates and displays "LAUNCH" on the display portion 215d of the small craft 201 at a step S43. Thus, the user on the small craft 201 is notified that automatic release is possible. At a step S44, the controller 211 determines whether or not "LAUNCH" (automatic release) has been selected on the basis of an operation from the user on the small craft 201 and repeats this determination until "LAUNCH" is selected. When determining that "LAUNCH" has been selected, the controller 211 performs control similar to the steps S4 to S8 according to the aforementioned first embodiment.

When determining that no obstacle has appeared at a step S6, the controller 211 determines whether or not the craft body 1a of the small craft 201 has been released from the trailer 202 by determining whether or not the craft body 1a of the small craft 201 has been moved to a position far enough away from the trailer 202 at a step S45. Specifically, the controller 211 determines whether or not the inclination of the craft body 1a has been sufficiently reduced by moving the craft body 1a to a water surface on the basis of a detection result of an acceleration sensor 13f. Furthermore, the controller 211 acquires a distance from the trailer 202 to the craft body 1a from the three-dimensional image (positional information) of the trailer 202 acquired by the stereo camera 214a. Then, the controller 211 determines whether or not the distance from the trailer 202 to the craft body 1a exceeds a prescribed threshold. When determining that the inclination of the craft body 1a has not been sufficiently reduced or that the distance from the trailer 202 to the craft body 1a does not exceed the prescribed threshold, the controller 211 determines that the craft body 1a has not been released from the trailer 202 and returns to the step S6. When determining that the inclination of the craft body 1a has been sufficiently reduced and that the distance from the trailer 202 to the craft body 1a exceeds the prescribed threshold, on the other hand, the controller 211 determines that the craft body 1a has been released from the trailer 202.

When the craft body 1a has been released from the trailer 202, the controller 211 performs control similar to the steps S10 and S11 according to the aforementioned first embodiment. After the craft body 1a is held at a fixed point at a step S11, the controller 211 determines whether or not the user has operated a shift lever 15b at a step S46. When determining that the user has not operated the shift lever 15b, the controller 211 returns to the step S11 and maintains holding of the small craft 201 at a fixed point. When determining that the user has operated the shift lever 15b, the controller 211 terminates the control in the small craft 201 during the operations for releasing the small craft 201 and switches the automatic trailer mode to a state where the user operates the small craft 201. Consequently, even when the user is on the small craft 201, the small craft 201 is automatically released from the trailer 202 without operations of the user.

<Attachment Operations>

Operations for attaching the small craft 201 in the trailing system 200 according to the second embodiment are now described with reference to a flowchart shown in FIG. 12. The following control (steps) in the small craft 201 is performed by the controller 211. Steps similar to those of the control flow for the attachment operations according to the first embodiment shown in FIG. 6 are denoted by the same reference numerals, to omit the description.

As a first step of the operations for attaching the small craft 201, another user (vehicle driver) different from the user on the small craft 201 drives the vehicle and moves the trailer 202 to the inclined portion. On the other hand, the user on the small craft 201 selects the automatic trailer mode through the input portion 215c.

Figure 12:
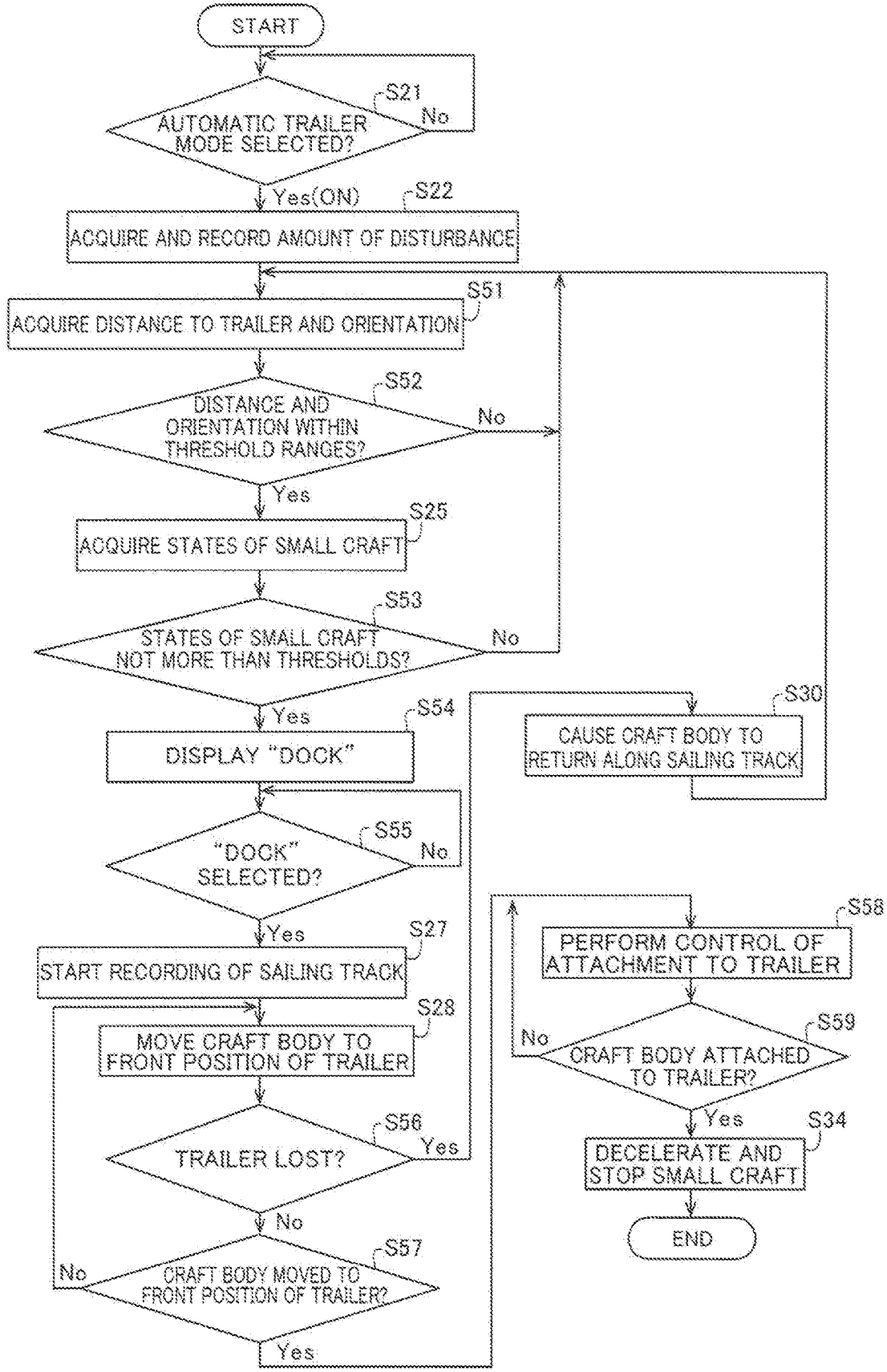
FIG. 12 is a flowchart showing small craft control involved in attachment in the trailing system according to the second embodiment of the present invention.

The controller 211 of the small craft 201 performs control similar to the steps S21 and S22 according to the aforementioned first embodiment, as shown in FIG. 12. At a step S51, the controller 211 acquires the distance from the trailer 202 to the craft body 1a and the orientation of the craft body 1a with respect to the trailer 202 from the three-dimensional images of the departure point and the vehicle towing the trailer 202 recorded when the craft body 1a is released and a three-dimensional image (positional information) of the trailer 202 currently acquired by the stereo camera 214a. At a step S52, the controller 211 determines whether or not the acquired distance and orientation are within respective prescribed threshold ranges. When determining that the acquired distance is not within the prescribed threshold range or that the acquired orientation is not within the prescribed threshold range, the controller 211 returns to the step S51. According to the second embodiment, the user on the small craft 201 operates the small craft 201, whereby the distance and the orientation can be within the respective prescribed threshold ranges.

When determining that the distance and the orientation are within the respective prescribed threshold ranges, the controller 211 acquires the states (the speed of the craft body 1a, the rotational speed of the engine, the acceleration of the craft body 1a, and the angular speed of the craft body 1a) of the small craft 201, similarly to the step S25 according to the aforementioned first embodiment and determines whether or not the speed of the craft body 1a, the rotational speed of the engine, the acceleration of the craft body 1a, and the angular speed of the craft body 1a are not more than respective prescribed thresholds at a step S53. When determining that the speed of the craft body 1a, the rotational speed of the engine, the acceleration of the craft body 1a, or the angular speed of the craft body 1a exceeds the prescribed threshold, the controller 211 returns to the step S51. According to the second embodiment, the user on the small craft 201 operates the small craft 201, whereby the speed of the craft body 1a, the rotational speed of the engine, the acceleration of the craft body 1a, and the angular speed of the craft body 1a can be not more than the respective prescribed thresholds.

When determining that the speed of the craft body 1a, the rotational speed of the engine, the acceleration of the craft body 1a, and the angular speed of the craft body 1a are not more than the respective prescribed thresholds (the states of the small craft 201 are not more than the thresholds), the controller 211 illuminates and displays "DOCK" on the display portion 215d at a step S54. Thus, the user on the small craft 201 is notified that automatic attachment is possible. At a step S55, the controller 211 determines whether or not "DOCK" (automatic attachment) has been selected on the basis of an operation from the user on the small craft 201 and repeats this determination until "DOCK" is selected. When determining that "DOCK" has been selected, the controller 211 performs control similar to the steps S27 and S28 according to the aforementioned first embodiment.

After feedback-controlling the propulsion device 10 at a step S28, the controller 211 determines and stores in memory 214c whether or not it is impossible for the stereo camera 214a to image the trailer 202, and further stores in memory 214c whether or not the trailer 202 is lost at a step S56. When losing the trailer 202, the controller 211 controls the propulsion device 10 to cause the craft body 1a to return along the sailing track at a step S30. Then, the controller 11 returns to the step S51.

When not losing the trailer 202, the controller 211 determines whether or not the craft body 1a has been moved to the front position of the trailer 202 on the basis of the three-dimensional image (positional information) taken by the stereo camera 214a at a step S57. When determining that the craft body 1a has not been moved to the front position of the trailer 202, the controller 211 returns to the step S28. When determining that the craft body 1a has been moved to the front position of the trailer 202, the controller 211 performs control of attachment to the trailer 202 at a step S58. Specifically, the controller 211 detects the distance from the trailer 202 to the craft body 1a, the orientation of the small craft 201, and the deviation of the craft body 1a in a width direction with respect to the trailer 202 from the three-dimensional images taken by the stereo camera 214a and feedback-controls the propulsion device 10 to move the craft body 1a toward the attachment position of the trailer 202, taking the distance, the orientation, and the deviation in the width direction into consideration. Consequently, the controller 211 controls the propulsion device 10 on the basis of the distance from the craft body 1a to the trailer 202 and the orientation of the craft body 1a with respect to the trailer 202.

At a step S59, the controller 211 determines whether or not the craft body 1a of the small craft 201 has been attached to the attachment position of the trailer 202. Specifically, the controller 211 determines whether or not the inclination of the craft body 1a has entered a prescribed threshold range by movement of the craft body 1a to the attachment position on the basis of the detection result of the acceleration sensor 13f. Furthermore, the controller 211 determines whether or not the craft body 1a is located in the attachment position of the trailer 202 on the basis of the position of the trailer 202 acquired from the three-dimensional image taken by the stereo camera 214a. When determining that the inclination of the craft body 1a has not entered the prescribed threshold range or that the craft body 1a is not located in the attachment position of the trailer 202, the controller 211 returns to the step S58.

When determining that the inclination of the craft body 1a has entered the prescribed threshold range and that the craft body 1a is located in the attachment position of the trailer 202, the controller 211 controls the propulsion device 10 to decelerate and stop the small craft 201 at a step S34. Thus, the controller 211 terminates the control (automatic trailer mode) in the small craft 201 during the operations for attaching the small craft 201. Then, the user attaches and fixes the craft body 1a to the trailer 202. Then, the user stops the engine 10a. Finally, the user drives the vehicle and moves the trailer 202 on which the small craft 201 is loaded from the inclined portion.

Effects of Second Embodiment

According to the second embodiment, the following effects are obtained.

According to the second embodiment, as hereinabove described, the small craft 201 is provided with the controller 211 configured to control the propulsion device 10 on the basis of the positional information about the trailer 202 acquired by the stereo camera 214a when the craft body 1a is released from and attached to the trailer 202. Thus, the small craft 201 can be easily attached and released, similarly to the aforementioned first embodiment.

According to the second embodiment, the controller 211 is configured to determine whether or not the craft body 1a is movable to the attachment position (a position from which the craft body 1a is movable to the front position of the trailer 202) on the basis of the attachment position recorded in the memory 214c. Thus, even when the trailer 202 transmits no signal related to the positional information about the trailer 202, the small craft 201 can recognize the attachment position of the trailer 202 on the basis of the attachment position recorded in the memory 214c. Consequently, the controller 211 can reliably determine whether or not the craft body 1a is movable to the attachment position.

According to the second embodiment, the small craft 201 is configured to form the three-dimensional image by synthesizing the images taken by the pair of cameras of the stereo camera 214a, whereby the positional information about the trailer 202 can be easily acquired by recognizing the position of the trailer 202 with the stereo camera 214a. The remaining effects of the second embodiment are similar to those of the aforementioned first embodiment.

Third Embodiment

A third embodiment of the present invention is now described with reference to FIG. 13. In this third embodiment, an example in which in addition to the trailing system 200 according to the aforementioned second embodiment, an indicator 302g is provided in a trailer 302 is described. Portions similar to those of the trailing system 200 according to the second embodiment are denoted by the same reference numerals, to omit the description.

(Structure of Trailing System)

Figure 13:
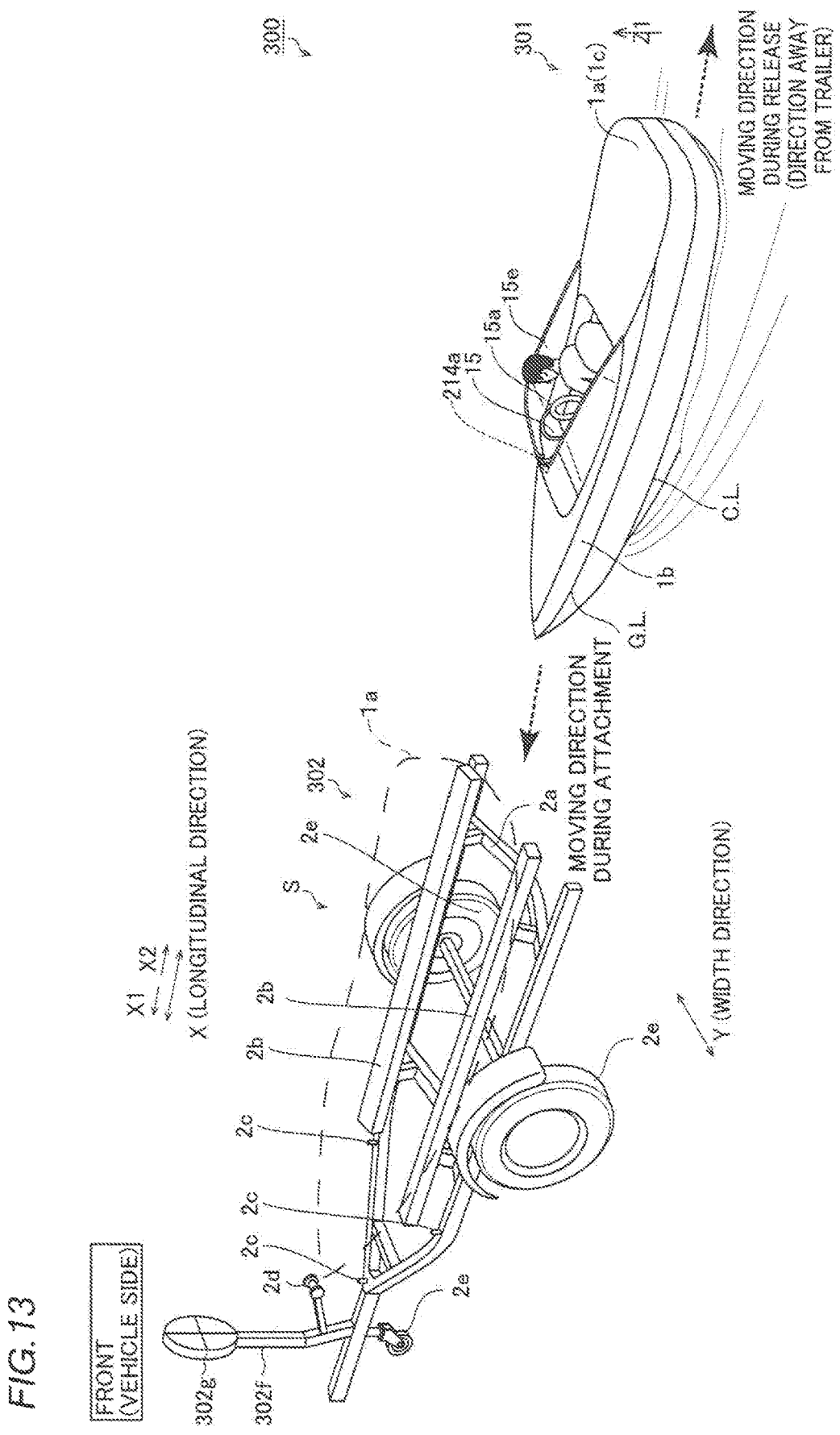
FIG. 13 is a perspective view showing a small craft and a trailer in a trailing system according to a third embodiment of the present invention.

A trailing system 300 according to the third embodiment includes a small craft 301 and the trailer 302, as shown in FIG. 13.

<Structure of Small Craft>

A stereo camera 214a of the small craft 301 is arranged vertically above (direction Z1) a gunwale line G.L. of a craft body 1a, and is arranged vertically above a chine line C.L. of the craft body 1a. Furthermore, the stereo camera 214a is mounted on a position on which water is hardly splashed both when the small craft 301 travels and when the small craft 301 ties up. The stereo camera 214a is mounted on an inner surface of a windshield 15e of the craft body 1a, for example.

<Structure of Trailer>

The trailer 302 is further provided with a pole 302 and the indicator 302g in addition to the structure of the trailer 202 according to the second embodiment. This pole 302f vertically extends in the front (X1 side) of the trailer 302 in a longitudinal direction (direction X). The indicator 302g is mounted on an upper end of the pole 302f. The indicator 302g includes a circular plate provided with a cross pattern, and is mounted on the pole 302f such that the cross pattern is viewable from the back (X2 side) in the longitudinal direction.

The indicator 302g is mounted on the upper end of the pole 302f to be located vertically above (direction Z1) a pair of supporting portions 2b on which the craft body 1a is loaded. The stereo camera 214a is configured to image the indicator 302g to acquire positional information about the trailer 302.

According to each of the second and third embodiments, a monocular camera, a TOF (time-of-flight) camera, an infrared camera, a compound eye camera, an omnidirectional camera, etc. can be used instead of the stereo camera 214a. The remaining structure of the third embodiment and control in the trailing system 300 during release operations and during attachment operations are similar to those of the second embodiment.

Effects of Third Embodiment

According to the third embodiment, the following effects can be obtained.

According to the third embodiment, as hereinabove described, the stereo camera 214a is configured to acquire the positional information about the trailer 302 by imaging the indicator 302g located vertically above (direction Z1) the pair of supporting portions 2b. Thus, the indicator 302g arranged vertically above the supporting portions 2b enables the stereo camera 214a to more reliably acquire the positional information about the trailer 302. The remaining effects of the third embodiment are similar to those of the aforementioned second embodiment.

Fourth Embodiment

A fourth embodiment of the present invention is now described with reference to FIGS. 14 to 16. In this fourth embodiment, an example in which in addition to the trailing system 200 according to the aforementioned second embodiment, steering of a plurality of propulsion devices (a left propulsion device 410 and a right propulsion device 510) is independently controlled is described. Portions similar to those of the trailing system 100 and the trailing system 200 according to the first and second embodiments are denoted by the same reference numerals, to omit the description.

(Structure of Trailing System)

Figure 14:
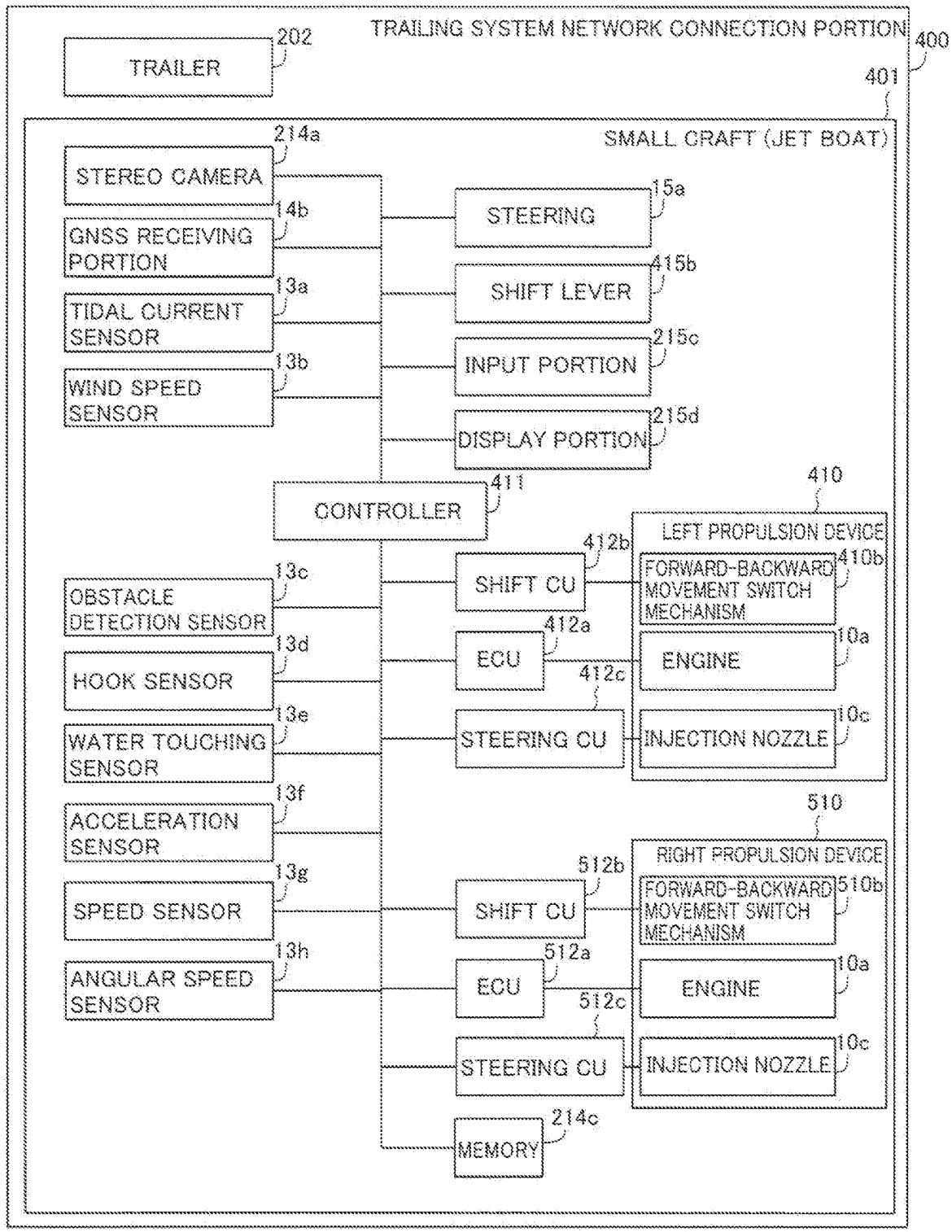
FIG. 14 is a block diagram of a trailing system according to a fourth embodiment of the present invention.

A trailing system 400 according to the fourth embodiment includes a small craft 401 and a trailer 202, as shown in FIG. 14.

<Structure of Small Craft>

The small craft 401 includes the left prolusion device 410 provided in a portside rear portion in a craft body 1a in the width direction (a direction orthogonal to the longitudinal direction of the craft body 1a) of the craft body 1a and the right prolusion device 510 provided in a starboard rear portion in the craft body 1a in the width direction. The left propulsion device 410 includes an engine 10a, a forward-backward movement switch mechanism 410b, and an injection nozzle 10c. The right propulsion device 510 includes an engine 10a, a forward-backward movement switch mechanism 510b, and an injection nozzle 10c. The left propulsion device 410 and the right propulsion device 510 are examples of the "propulsion device" in the present invention.

The small craft 401 includes an ECU 412a configured to control the engine 10a of the left propulsion device 410, a shift CU 412b configured to control the forward-backward movement switch mechanism 410b, and a steering CU 412c configured to control the injection nozzle 10c on the basis of instructions from a controller 411. Similarly, the small craft 401 includes an ECU 512a configured to control the engine 10a of the right propulsion device 510, a shift CU 512b configured to control the forward-backward movement switch mechanism 510b, and a steering CU 512c configured to control the injection nozzle 10c on the basis of instructions from the controller 411. Consequently, the steering CU 412c configured to control the injection nozzle 10c of the left propulsion device 410 and the steering CU 512c configured to control the injection nozzle 10c of the right propulsion device 510 are provided separately from each other, whereby the controller 411 is configured to control steering of the left propulsion device 410 and steering of the right propulsion device 510 independently of each other.

The small craft 401 includes a shift lever 415b to be operated by a user to switch a shift state and a throttle opening. The shift lever 415b is provided with a forward movement position that switches the craft body 1a to forward propulsion, a backward movement position that switches the craft body 1a to backward propulsion, and a neutral position that does not propel the craft body 1a forward or backward as the position of the shift lever 415b operated by the user. On the basis of the position of the shift lever 415b operated by the user, the controller 411 performs control of shifting the forward-backward movement switch mechanism 410b of the left propulsion device 410 through the shift CU 412b and performs control of shifting the forward-backward movement switch mechanism 510b of the right propulsion device 510 through the shift CU 512b.

The shift lever 415b is an example of the "switching operation portion" in the present invention.

When the shift lever 415b is at the neutral position, the forward-backward movement switch mechanisms 410b and 510b are in a state where the shift state is neither a forward movement state nor a backward movement state (neutral state), and the opening of an unshown throttle is an idling opening (an opening in an idling state where no drive force is output) by control by the controller 411 through the shift CUs 412b and 512b, respectively, except during operations for releasing and attaching the craft body 1a of the small craft 401.

<Release Operations>

Figure 15:
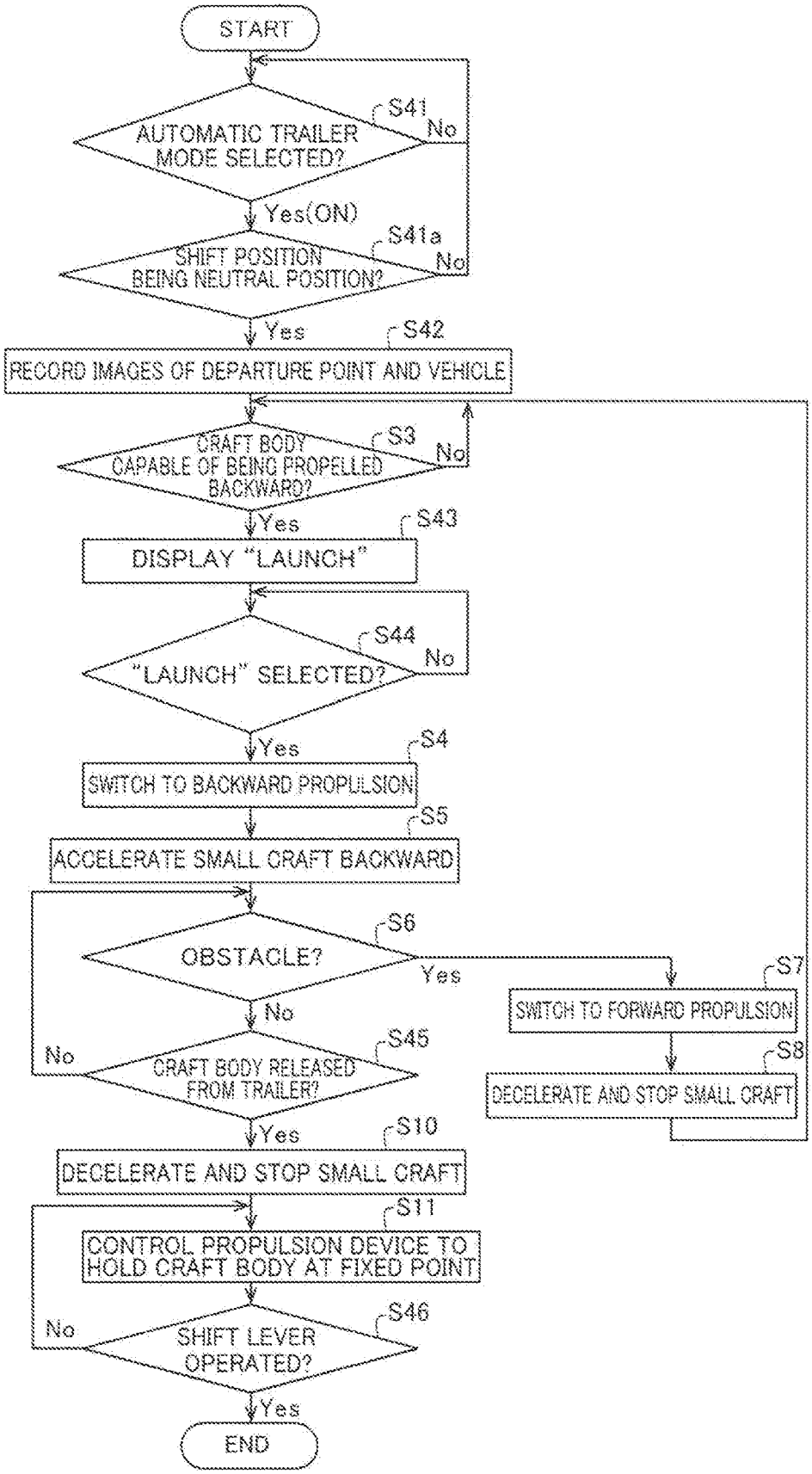
FIG. 15 is a flowchart showing small craft control involved in release in the trailing system according to the fourth embodiment of the present invention.

The operations for releasing the small craft 401 in the trailing system 400 according to the fourth embodiment are now described using mainly a flowchart shown in FIG. 15. The following control (steps) in the small craft 401 is performed by the controller 411 (see FIG. 14). Steps similar to those of the control flow for the release operations according to the second embodiment shown in FIG. 11 are denoted by the same reference numerals, to omit the description properly.

As shown in FIG. 15, the controller 411 of the small craft 401 determines whether or not the position of the shift lever 415b is the neutral position at a step S41a when an automatic trailer mode is selected at a step S41, similarly to the aforementioned second embodiment. When the position of the shift lever 415b is not the neutral position, the controller 411 does not shift to the automatic trailer mode but returns to the step S41. When the position of the shift lever 415b is not the neutral position, therefore, the controller 411 restrains shifting to the automatic trailer mode. When the position of the shift lever 415b is the neutral position, the controller 411 advances to a step S42. Then, the controller 411 performs control similar to that according to the second embodiment.

<Attachment Operations>

Figure 16:
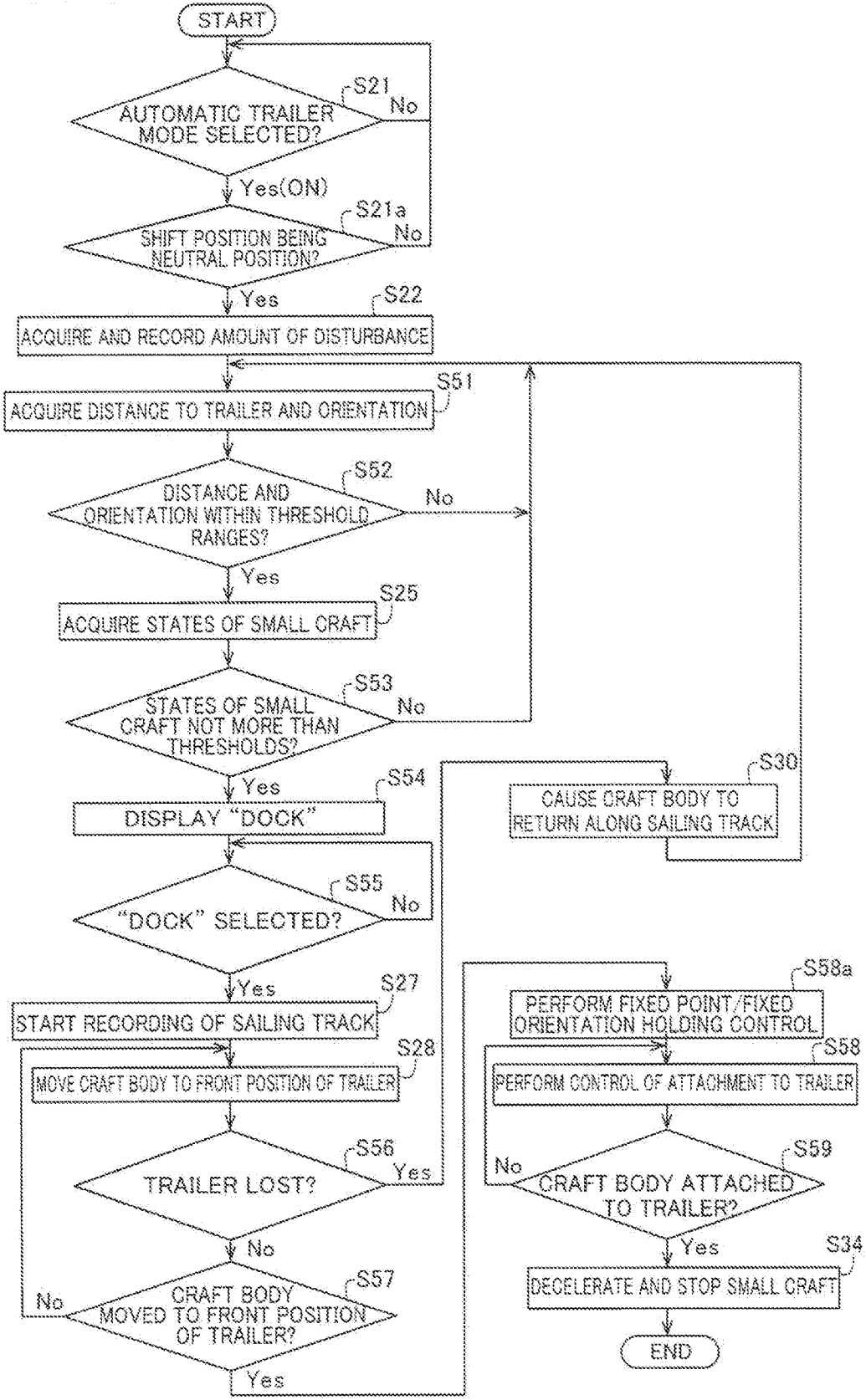
FIG. 16 is a flowchart showing small craft control involved in attachment in the trailing system according to the fourth embodiment of the present invention.

The operations for attaching the small craft 401 in the trailing system 400 according to the second embodiment are now described using a flowchart shown in FIG. 16. The following control (steps) in the small craft 401 is performed by the controller 411. Steps similar to those of the control flow for the attachment operations according to the second embodiment shown in FIG. 12 are denoted by the same reference numerals, to omit the description properly.

As shown in FIG. 16, the controller 411 of the small craft 401 determines whether or not the position of the shift lever 415b is the neutral position at a step S21a when the automatic trailer mode is selected at a step S21, similarly to the aforementioned second embodiment. When the position of the shift lever 415b is not the neutral position, the controller 411 does not shift to the automatic trailer mode but returns to the step S21. When the position of the shift lever 415b is not the neutral position, therefore, the controller 411 restrains shifting to the automatic trailer mode. When the position of the shift lever 415b is the neutral position, the controller 411 advances to a step S22. Then, the controller 411 performs control at steps S51, S52, S25, S53, S54, S55, S27, S28, S56, and S57, similarly to those according to the second embodiment.

Figure 17:
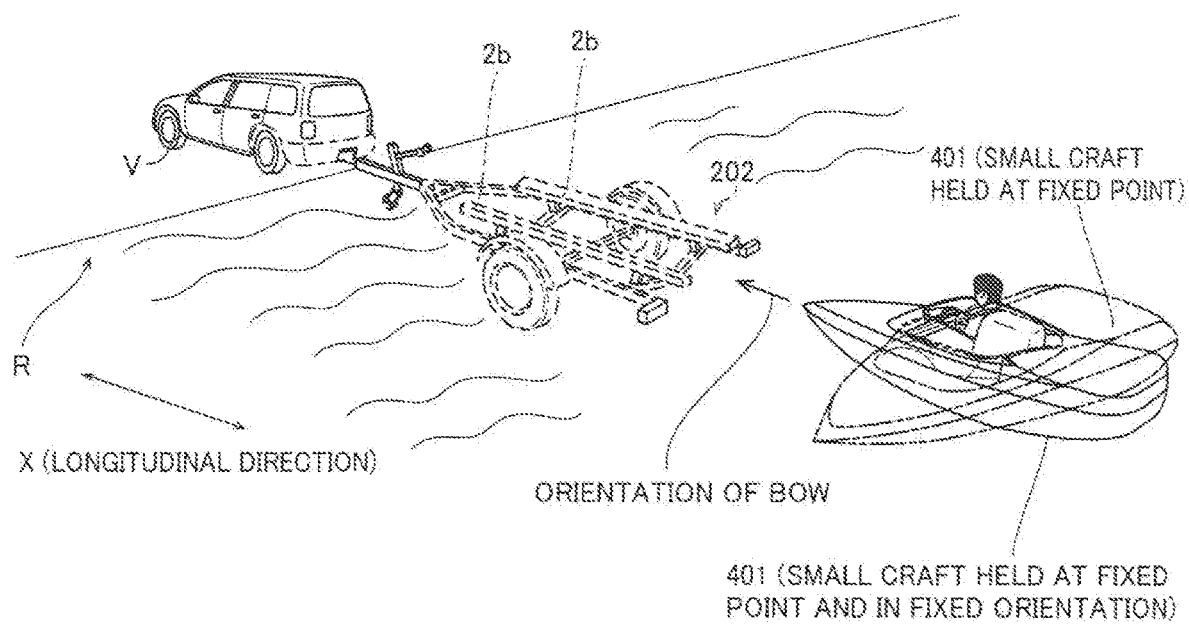
FIG. 17 schematically illustrates a state where at least one of the position and orientation of a small craft is held in the trailing system according to the fourth embodiment of the present invention.

When determining that the craft body 1a has been moved to the front position of the trailer 202 (the vicinity of an attachment position S of the trailer 202) at the step S57, the controller 411 controls of holding both the position and orientation of the craft body 1a (fixed point/fixed orientation holding control) at a step S58a. Specifically, the controller 411 acquires, from a three-dimensional image (positional information) of the trailer 202, the positions of a pair of supporting portions 2b of the trailer 202 and the orientation (bow orientation) of the bow of the craft body 1a with respect to a direction (longitudinal direction) in which the supporting portions 2b of the trailer 202 extend. Then, the controller 411 controls the left propulsion device 410 and the right propulsion device 510 such that in the front position of the trailer 202, the longitudinal direction in which the pair of supporting portions 2b extend and the orientation (craft orientation) of the bow of the craft body 1a are substantially parallel to each other, and the bow of the craft body 1a faces the trailer 102, as shown in FIG. 17. At this time, the steering of the left propulsion device 410 and the steering of the right propulsion device 510 can be controlled independently of each other, whereby the bow of the craft body 1a can be turned. Thus, the bow of the craft body 1a can be turned and held in a desired orientation while the craft body 1a is held at a fixed point in the front position of the trailer 202. So far as the craft body 1a is held in a fixed orientation, the craft body 1a of the trailing system 400 may be configured to be slightly moved in a direction (fixed orientation) toward the trailer 202.

According to the fourth embodiment, when the user operates the shift lever 415b such that the position of the shift lever 415b is no longer the neutral position, the automatic trailer mode is canceled.

Effects of Fourth Embodiment

According to the fourth embodiment, the following effects can be obtained.

According to the fourth embodiment, as hereinabove described, the controller 411 is configured to determine whether or not the position of the shift lever 415b is the neutral position when the automatic trailer mode is selected. Thus, unexpected generation of a thrust force in the left propulsion device 410 and the right propulsion device 510 can be significantly reduced or prevented, and hence switching between the time of the operations for releasing the craft body 1a from the trailer 202 and/or the operations for attaching the craft body 1a to the trailer 202 and the time of a non-operation can be smoothly made.

According to the fourth embodiment, the controller 411 is configured to control the left propulsion device 410 and the right propulsion device 510 such that in the front position of the trailer 202, the longitudinal direction in which the pair of supporting portions 2b extend and the orientation (craft orientation) of the bow of the craft body 1a are substantially parallel to each other, and the bow of the craft body 1a faces the trailer 102. Thus, it is possible to significantly reduce or prevent the possibility that the orientation of the craft body 1a fails to be substantially parallel to the longitudinal direction in which the supporting portions 2b extend during the operations for attaching the craft body 1a to the trailer 202, and hence it is possible to restrain the craft body 1a from deviating from the trailer 202. Consequently, it is possible to reliably and significantly reduce or prevent the possibility that the craft body 1a cannot be attached to the supporting portions 2b of the trailer 202.

According to the fourth embodiment, the controller 411 is configured to perform control of holding both the position and orientation of the craft body 1a when determining that the craft body 1a has been moved to the front position of the trailer 202 (the vicinity of the attachment position S of the trailer 202). Thus, it is possible to more reliably restrain the craft body 1a from deviating from the trailer 202 regardless of disturbance or the like immediately before attaching the craft body 1a in the vicinity of the attachment position S, and hence it is possible to more reliably and significantly reduce or prevent the possibility that the craft body 1a cannot be attached to the supporting portions 2b of the trailer 202.

According to the fourth embodiment, the trailing system 400 is configured to control the steering of the left propulsion device 410 and the steering of the right propulsion device 510 independently of each other. Thus, the trailing system 400 enables the small craft 401 to easily turn, move back and forth, move parallel from side to side, turn its bow, etc., and hence it is possible to control the movement of the small craft 401 in more detail. The remaining effects of the fourth embodiment are similar to those of the aforementioned second embodiment.

Fifth Embodiment

A fifth embodiment of the present invention is now described with reference to FIGS. 6 and 18 to 22. In this fifth embodiment, an example in which a controller 611 performs control during operations for releasing a craft body 1a and operations for attaching the craft body 1a on the basis of the thrust force and the rudder angle of a propulsion device 610, unlike the trailing system 100 according to the aforementioned first embodiment is described. Portions similar to those of the trailing system 100 according to the first embodiment are denoted by the same reference numerals, to omit the description.

(Structure of Trailing System)

Figure 18:
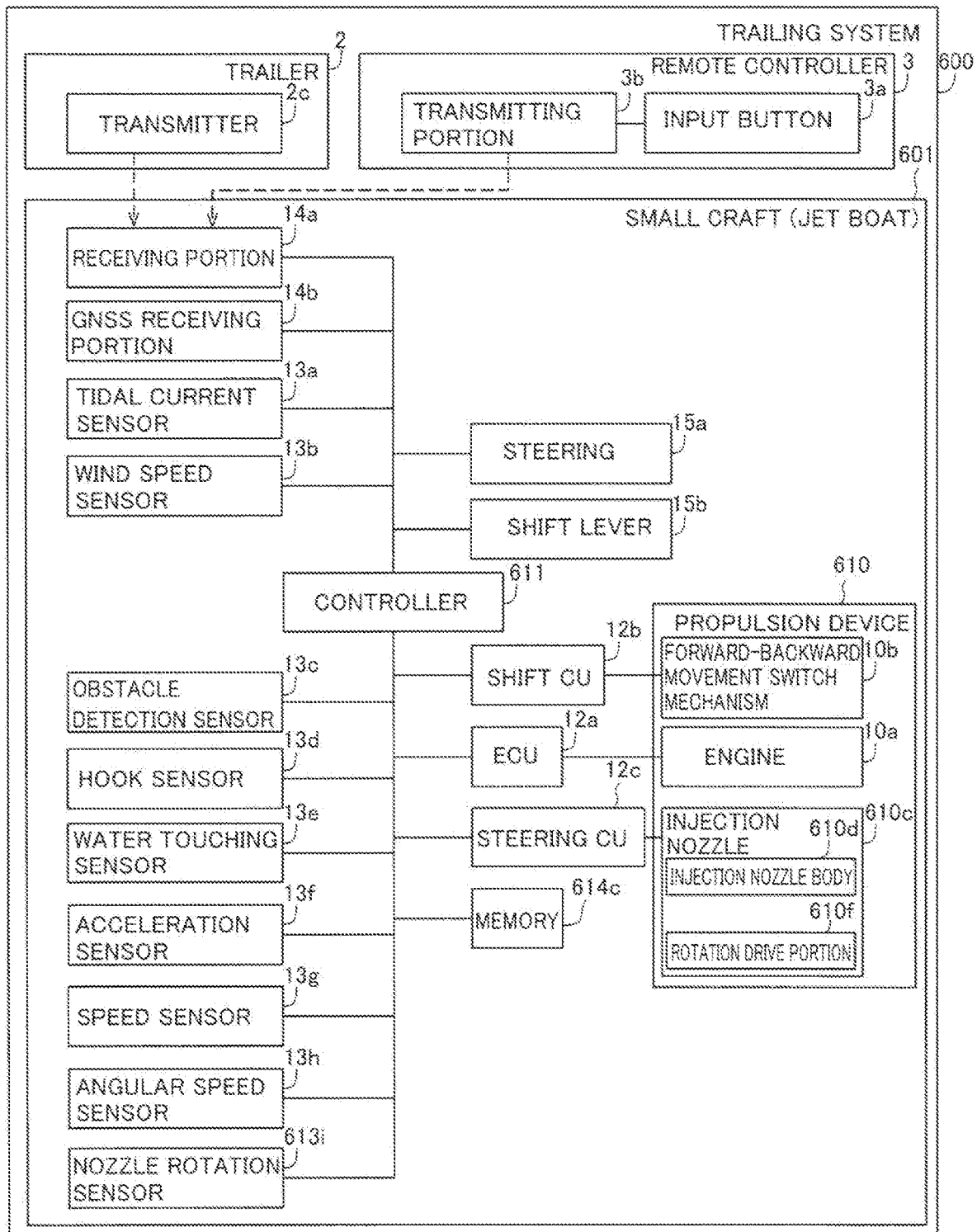
FIG. 18 is a block diagram of the trailing system according to the fifth embodiment of the present invention.

A trailing system 600 according to the fifth embodiment includes a small craft 601, a trailer 2, and a remote controller 3, as shown in FIG. 18.

One propulsion device 610 of the small craft 601 includes an injection nozzle 610c. This injection nozzle 610c includes an injection nozzle body 610d and a rotation drive portion 610f configured to rotate the injection nozzle body 610d about a rotation shaft 610e (see FIG. 19).

Figure 19:
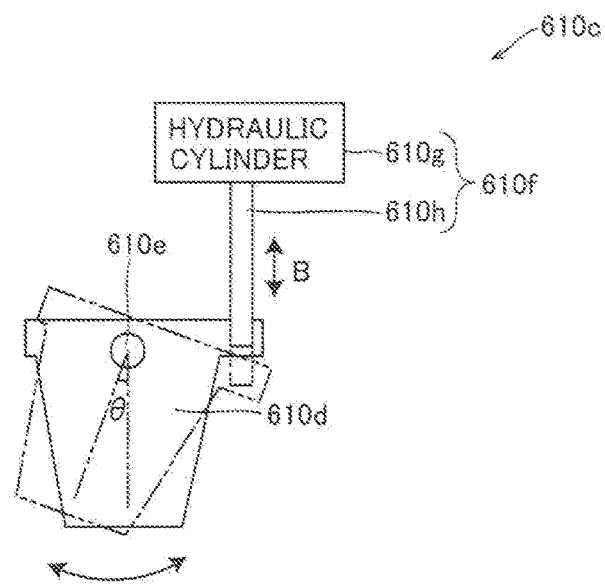
FIG. 19 is a diagram schematically showing an injection nozzle of a small craft in the trailing system according to the fifth embodiment of the present invention.

The rotation drive portion 610f includes a hydraulic cylinder 610g as a drive source and an arm 610h slidingly moved along arrow B by driving the hydraulic cylinder 610g, as shown in FIG. 19. One end of the arm 610h along arrow B is fixed to the hydraulic cylinder 610g, and the other end of the arm 610h along arrow B is fixed to the injection nozzle body 610d. Thus, when the hydraulic cylinder 610g is driven so that the arm 610h is moved along arrow B, the injection nozzle body 610d is rotated about the rotation shaft 610e.

The small craft 601 further includes a nozzle rotation sensor 613i as one of various sensors, as shown in FIG. 18. The nozzle rotation sensor 613i detects the rotation angle θ (see FIG. 19) of the injection nozzle body 610d about the rotation shaft 610e.

Figure 20:
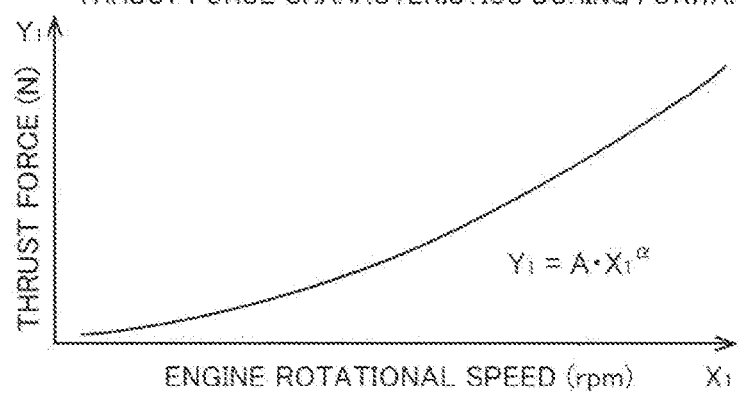
FIG. 20 is a graph illustrating engine rotational speed-thrust force characteristics during forward propulsion of the trailing system according to the fifth embodiment of the present invention.
Figure 21:
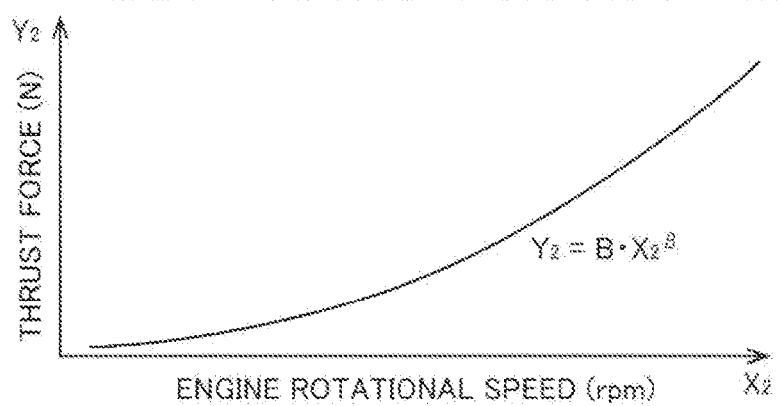
FIG. 21 is a graph illustrating engine rotational speed-thrust force characteristics during backward propulsion of the trailing system according to the fifth embodiment of the present invention.

A memory 614c of the small craft 601 records graphs shown in FIGS. 20 and 21. The graph (a graph illustrating engine rotational speed-thrust force characteristics during forward propulsion) shown in FIG. 20 shows a thrust force (N) generated from the propulsion device 610 corresponding to an engine rotational speed (rpm) during forward propulsion. The graph (a graph illustrating engine rotational speed-thrust force characteristics during backward propulsion) shown in FIG. 21 shows a thrust force (N) generated from the propulsion device 610 corresponding to an engine rotational speed (rpm) during backward propulsion. The graph illustrating the engine rotational speed-thrust force characteristics during forward propulsion and the graph illustrating the engine rotational speed-thrust force characteristics during backward propulsion are obtained in advance by a test or the like.

(Control in Trailing System)

In the trailing system 600 according to the fifth embodiment, the controller 611 of the small craft 601 is configured to control the propulsion device 610 on the basis of positional information about the trailer 2 acquired by a receiving portion 14a during operations for releasing the craft body 1a of the small craft 601 from the trailer 2 and operations for attaching the craft body 1a of the small craft 601 to the trailer 2. Furthermore, the controller 611 is configured to acquire the thrust force of the propulsion device 610 on the basis of an engine rotational speed acquired from an ECU 12a and both the graph (see FIG. 20) illustrating the engine rotational speed-thrust force characteristics during forward propulsion and the graph (see FIG. 21) illustrating the engine rotational speed-thrust force characteristics during backward propulsion recorded in the memory 614c, during the operations for releasing the craft body 1a and the operations for attaching the craft body 1a. The controller 611 is configured to control the thrust force or the like of the propulsion device 610 on the basis of the acquired thrust force of the propulsion device 610 and the rotation angle θ (the rudder angle of the propulsion device 610) of the injection nozzle body 610d about the rotation shaft 610e acquired from the nozzle rotation sensor 613i during the operations for releasing the craft body 1a and the operations for attaching the craft body 1a.

The controller 611 is configured to calculate a desired thrust force of the propulsion device 610 and control the engine rotational speed on the basis of the graph illustrating the engine rotational speed-thrust force characteristics during forward propulsion and the graph illustrating the engine rotational speed-thrust force characteristics during backward propulsion as feedback control, and is configured to calculate a desired rudder angle of the propulsion device 610 and control the rotation drive portion 610f as feedback control. The remaining structure of the fifth embodiment and the operations for releasing the small craft 601 are similar to those of the aforementioned first embodiment.

<Attachment Operations>

The operations for attaching the small craft 601 in the trailing system 600 according to the fifth embodiment are similar to those according to the aforementioned first embodiment except the control for moving the craft body 1a to the front position of the trailer 2 at the step S28 shown in FIG. 6. Thus, only control at a step S28 is described in detail, and the remaining control is omitted. The following control (steps) in the small craft 601 is performed by the controller 611.

Figure 22:
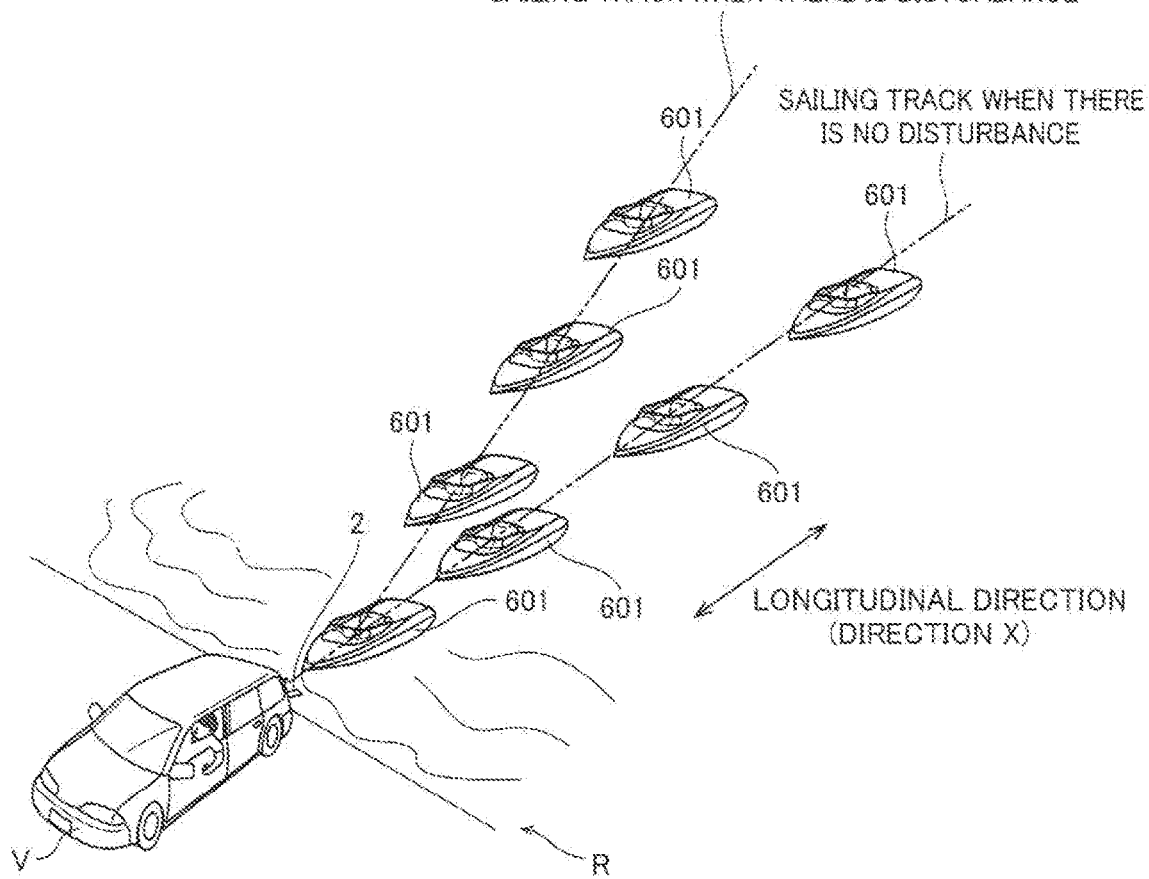
FIG. 22 schematically illustrates movement (wake) of the small craft in the trailing system according to the fifth embodiment of the present invention.

At the step S28, the controller 611 performs feedback control on the propulsion device 610 to move the craft body 1a of the small craft 601 to the front position of the trailer 2 (the vicinity of the attachment position S of the trailer 2) in order to get ready to dock. At this time, the controller 611 provides feedback control of the rudder angle and the thrust force of the propulsion device 610 to move the craft body 1a to the front position of the trailer 2 while maintaining a state where the orientation (craft orientation) of the bow of the craft body 1a with respect to the trailer 2 is an orientation substantially parallel to a longitudinal direction (direction X) in which a pair of supporting portions 2b (see FIG. 4) of the trailer 2 extend, in which the bow faces the trailer 2, as shown in FIG. 22. When acquiring the disturbance amount at a step S22, the controller 611 controls the thrust force and the rudder angle of the propulsion device 610, taking the disturbance into consideration. In other words, the controller 611 provides feedback control of the rudder angle and the thrust force of the propulsion device 610, taking the disturbance amount into consideration, to move the craft body 1*a* to the front position of the trailer 2 while maintaining the state where the craft orientation is the orientation substantially parallel to the longitudinal direction (direction X) in which the pair of supporting portions 2*b* (see FIG. 4) of the trailer 2 extend, in which the bow faces the trailer 2, regardless of the disturbance. Consequently, also when the craft body 1*a* is moved to the front position of the trailer 2, the state where the orientation (craft orientation) of the bow of the craft body 1*a* with respect to the trailer 2 is the orientation substantially parallel to the longitudinal direction, in which the bow faces the trailer 2, is maintained.

Effects of Fifth Embodiment

According to the fifth embodiment, the following effects can be obtained.

According to the fifth embodiment, as hereinabove described, the controller 611 is configured to control the propulsion device 610 such that in the front position of the trailer 2, the longitudinal direction in which the pair of supporting portions 2*b* extend and the orientation (craft orientation) of the bow of the craft body 1*a* are substantially parallel to each other, and the bow of the craft body 1*a* faces the trailer 2. Thus, similarly to the fourth embodiment, it is possible to reliably and significantly reduce or prevent the possibility that the craft body 1*a* cannot be attached to the supporting portions 2*b* of the trailer 2.

According to the fifth embodiment, the controller 611 is configured to control the thrust force of the propulsion device 610 on the basis of the thrust force of the propulsion device 610 acquired from the engine rotational speed during the operations for releasing the craft body 1*a* and the operations for attaching the craft body 1*a*. Thus, a thrust force to be output hereafter from the propulsion device 610 can be controlled on the basis of the acquired thrust force of the propulsion device 610, and hence the propulsion device 610 can be more accurately controlled. The remaining effects of the fifth embodiment are similar to those of the aforementioned first embodiment.

Sixth Embodiment

A sixth embodiment of the present invention is now described with reference to FIGS. 23 and 24. In this sixth embodiment, an example in which in addition to the trailing system 100 according to the aforementioned first embodiment, an unshown record medium of an Internet network I retains positional information about a small craft 701 and positional information about a trailer 702 is described. Portions similar to those of the trailing system 100 according to the first embodiment are denoted by the same reference numerals, to omit the description.
(Structure of Trailing System)

Figure 23:
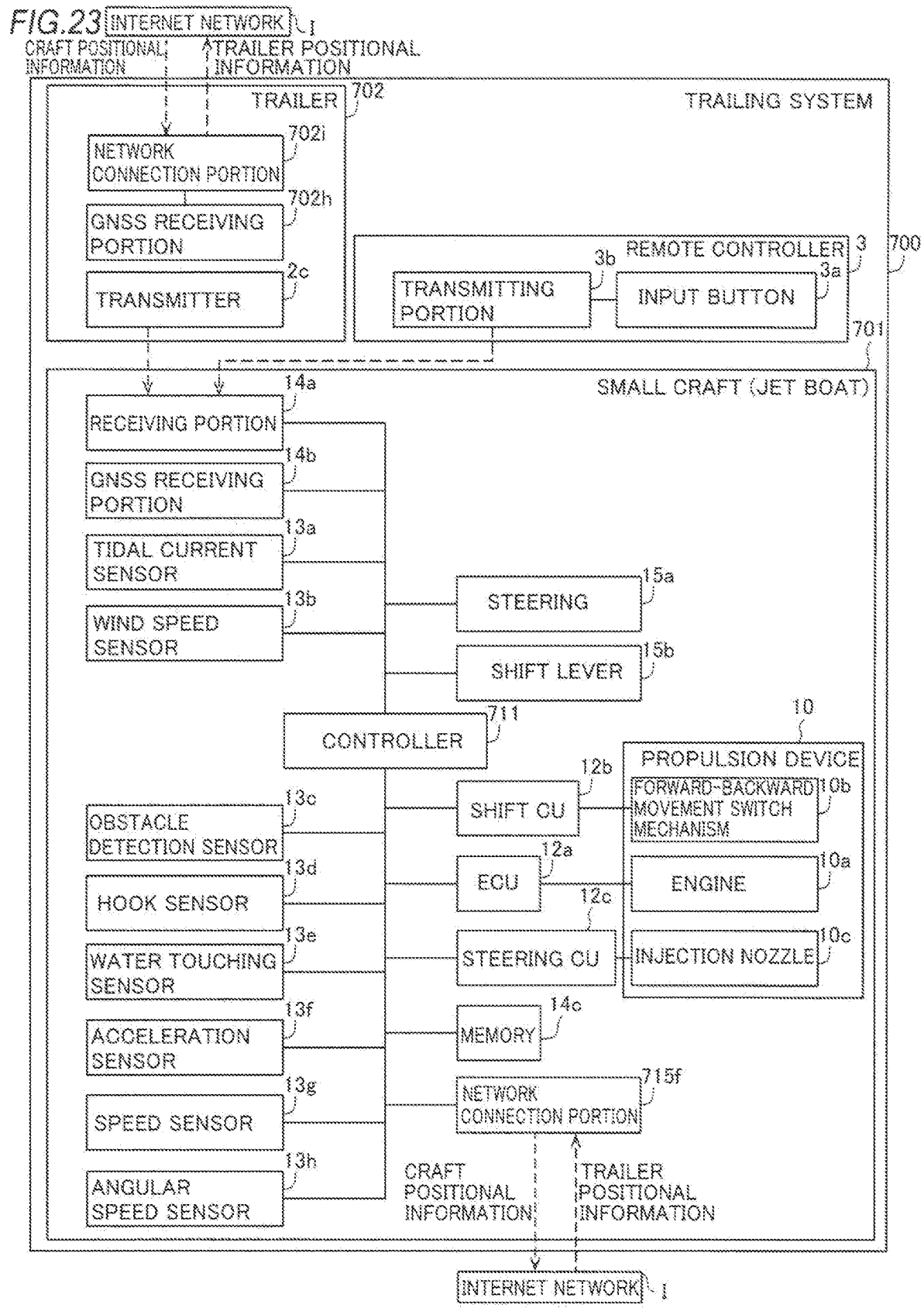
FIG. 23 is a block diagram of a trailing system according to a sixth embodiment of the present invention.

A trailing system 700 according to the sixth embodiment includes the small craft 701, the trailer 702, and a remote controller 3, as shown in FIG. 23.
<Structure of Small Craft>

The small craft 701 includes a network connection portion 715*f* configured to connect to the Internet network I in addition to the structure of the small craft 1 according to the aforementioned first embodiment.

<Structure of Trailer>

The trailer 702 includes a GNSS receiving portion 702*h* configured to regularly receive a GNSS signal from a GNSS satellite and a network connection portion 702*i* configured to connect to the Internet network I in addition to the structure of the trailer 2 according to the aforementioned first embodiment. In FIG. 23, there are two Internet networks I for convenience of illustration, but they are actually the same.
(Control in Trailing System)

In the trailing system 700 according to the sixth embodiment, the small craft 701 is configured to transmit the craft positional information about the small craft 701 acquired by a GNSS receiving portion 14*b* to the record medium on the Internet network I through the network connection portion 715*f*. The trailer 702 is configured to transmit the trailer positional information about the trailer 702 acquired by the GNSS receiving portion 702*h* to the record medium on the Internet network I through the network connection portion 702*i*. The record medium on the Internet network I is configured to record the transmitted craft positional information about the small craft 701 and the transmitted trailer positional information about the trailer 702 in association with each other.

The controller 711 of the small craft 701 is configured to acquire the trailer positional information from the record medium on the Internet network I to use the same in control of operations for releasing a craft body 1*a* of the small craft 701 from the trailer 702 and operations for attaching the craft body 1*a* of the small craft 701 to the trailer 702 (automatic trailing). Thus, even when a receiving portion 14*a* does not sufficiently receive signals transmitted from transmitters 2*c* of the trailer 702 and a signal (operation signal) transmitted from a transmitting portion 3*b* of the remote controller 3 due to the external environment (radio disturbance or the like), for example, the controller 711 can perform control of the automatic trailing on the basis of the trailer positional information acquired from the Internet network I.

Figure 24:
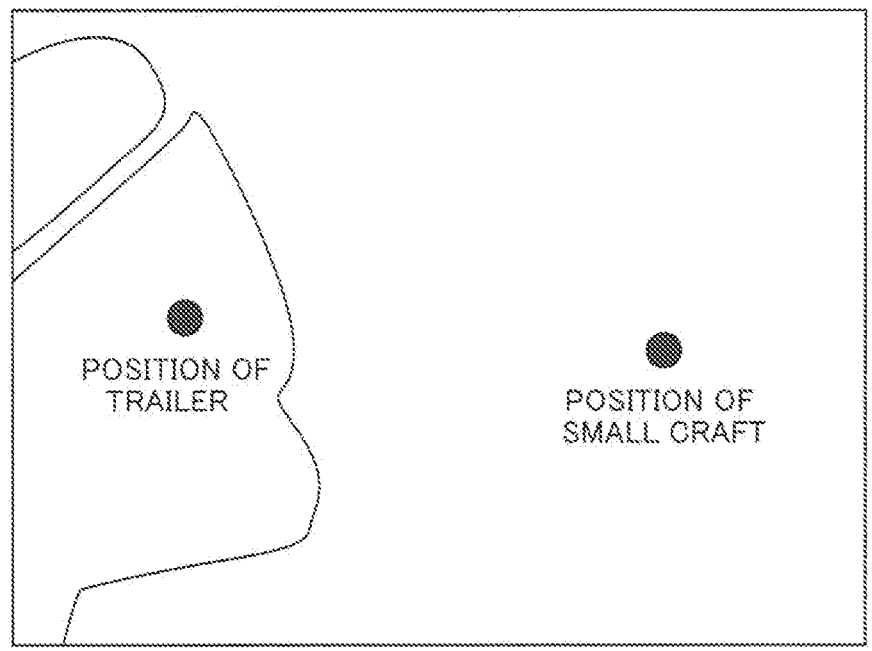
FIG. 24 is a diagram showing an example of a map of the trailing system according to the sixth embodiment of the present invention.

The trailer 702 enables a user (driver) of a vehicle V that tows the trailer 702 to confirm a craft position as a map shown in FIG. 24, for example, by acquiring the craft positional information from the record medium on the Internet network I. Thus, the user of the vehicle V can move the trailer 702 to a position suitable for attaching the craft body 1*a* of the small craft 701 to the trailer 702, for example.

In an unshown server provided with the record medium on the Internet network I, a roughly scheduled course during the operations for attaching the craft body 1*a* of the small craft 701 to the trailer 702 may be prepared on the basis of the craft positional information and the trailer positional information. The prepared scheduled course can be transmitted to the small craft 701 to be used in the automatic trailing (the operations for attaching the craft body 1*a* to the trailer 702) of the small craft 701. The remaining structure of the sixth embodiment, the operations for releasing the small craft 701, and the operations for attaching the small craft 701 are similar to those of the aforementioned first embodiment.

Effects of Sixth Embodiment

According to the sixth embodiment, the following effects can be obtained.

According to the sixth embodiment, as hereinabove described, the record medium on the Internet network I records the transmitted craft positional information about the small craft 701 and the transmitted trailer positional information about the trailer 702. Thus, the craft positional information about the small craft 701 and the trailer positional information about the trailer 702 can be easily accessed, and hence both the small craft 701 and the trailer 702 can easily acquire each other's positional information to use the same in the automatic trailing. Furthermore, the craft positional information about the small craft 701 and the trailer positional information about the trailer 702 can be also accessed through a network connection terminal other than the small craft 701 and the trailer 702, and hence the user away from the small craft 701 and the trailer 702 can confirm the position of the small craft 701 and the position of the trailer 702, for example. The remaining effects of the sixth embodiment are similar to those of the aforementioned first embodiment.

Seventh Embodiment

A seventh embodiment of the present invention is now described with reference to FIG. 25. In this seventh embodiment, an example in which the functions of a smartphone 804 as a portable device are used in place of some of the functions of the small craft 201 of the trailing system 200 according to the aforementioned second embodiment is described. Portions similar to those of the trailing system 200 according to the second embodiment are denoted by the same reference numerals, to omit the description.
(Structure of Trailing System)

Figure 25:
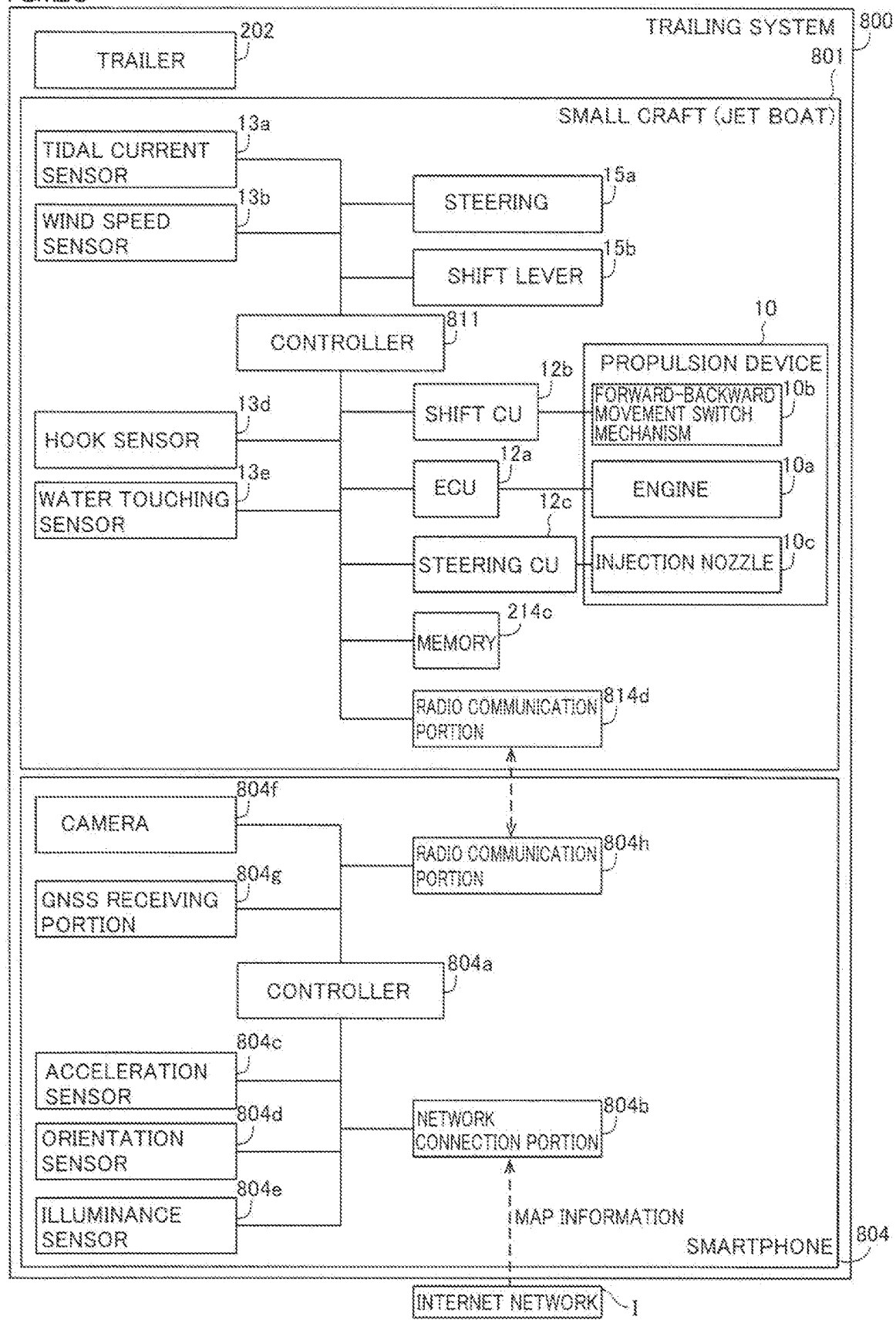
FIG. 25 is a block diagram of a trailing system according to a seventh embodiment of the present invention.

A trailing system 800 according to the seventh embodiment includes a small craft 801, a trailer 202, and the smartphone 804, as shown in FIG. 25. The smartphone 804 is an example of the "position acquisition portion", the "position detection portion", the "obstacle detection portion", the "attitude detection portion", or the "target recognizer" in the present invention.
<Structure of Small Craft>

The small craft 801 is provided with no stereo camera 214a, GNSS receiving portion 14b, obstacle detection sensor 13c, acceleration sensor 13f, speed sensor 13g, or angular speed sensor 13h, unlike the small craft 201 according to the aforementioned second embodiment. On the other hand, the small craft 801 includes a radio communication portion 814d configured to wirelessly communicate with the smartphone 804 by Bluetooth (registered trademark) or over WiFi. The small craft 801 is provided with a mounting portion (not shown) configured to fix the smartphone 804 to the craft body 1a. This mounting portion is preferably provided on an inner surface of a windshield 15e (see FIG. 13) or the like vertically above (direction Z1) a chine line C.L. (see FIG. 13) of the craft body 1a.
<Structure of Smartphone>

The smartphone 804 includes a controller 804a configured to totally control the smartphone 804 and a network connection portion 804b configured to connect to an Internet network I.

The smartphone 804 includes an acceleration sensor 804c, an orientation sensor 804d, and an illuminance sensor 804e as various sensors. The acceleration sensor 804c detects the acceleration and the attitude of the smartphone 804. The orientation sensor 804d detects the orientation of the smartphone 804. The illuminance sensor 804e detects an illuminance around the smartphone 804.

The smartphone 804 includes a camera 804f and a GNSS receiving portion 804g configured to regularly receive a GNSS signal from a GNSS satellite.

The smartphone 804 further includes a radio communication portion 804h configured to wirelessly communicate with the small craft 801 by Bluetooth (registered trademark) or over WiFi.

According to the seventh embodiment, a controller 811 of the small craft 801 is configured to acquire information used in automatic trailing from the smartphone 804. Specifically, the controller 811 is configured to set the acceleration and the attitude of the smartphone 804 acquired through the radio communication portions 804h and 814d as the acceleration (speed) and the attitude of the craft body 1a. The controller 811 is configured to set the orientation of the smartphone 804 acquired through the radio communication portions 804h and 814d as the craft orientation of the craft body 1a. The controller 811 is configured to acquire positional information about the trailer 202 (a distance from the trailer 202 to the craft body 1a) and information about an obstacle around the craft body 1a from an image taken by the camera 804f acquired through the radio communication portions 804h and 814d. The controller 811 is configured to set positional information about the smartphone 804 acquired through the radio communication portions 804h and 814d as positional information about the craft body 1a. The controller 811 is configured to perform operations for releasing the small craft 801 or attaching the small craft 801 in the trailing system 800 on the basis of the information acquired from the smartphone 804.

The controller 811 is configured to calculate a solar radiation direction from the illuminance around the smartphone 804 acquired through the radio communication portions 804h and 814d. The controller 811 is configured to cause the smartphone 804 to acquire surrounding map information from the Internet network I through the network connection portion 804b and to cause the smartphone 804 to transmit the surrounding map information to the small craft 801 through the radio communication portions 804h and 814d. Thus, the controller 811 can acquire the surrounding map information from the Internet network I. The remaining structure of the seventh embodiment, the operations for releasing the small craft 801, and the operations for attaching the small craft 801 are similar to those of the aforementioned second embodiment.

Effects of Seventh Embodiment

According to the seventh embodiment, the following effects can be obtained.

According to the seventh embodiment, as hereinabove described, the controller 811 is configured to perform the operations for releasing the small craft 801 or attaching the small craft 801 in the trailing system 800 on the basis of the information acquired from the smartphone 804. Thus, the structure of the small craft 801 can be simplified. The remaining effects of the seventh embodiment are similar to those of the aforementioned second embodiment.
(Modification)

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the propulsion device is controlled on the basis of the positional information about the trailer during both the operations for attaching the small craft to the trailer and the operations for releasing the small craft from the trailer in each of the aforementioned first to seventh embodiments, the present invention is not restricted to this. According to the present invention, the propulsion device may alternatively be controlled on the basis of the positional information about the trailer during either the operations for attaching the small craft to the trailer or the operations for releasing the small craft from the trailer.

While the receiving portion configured to receive the signals transmitted from the transmitters of the trailer is employed as the "position acquisition portion" according to the present invention in the aforementioned first embodiment, the stereo camera is employed as the "position acquisition portion" according to the present invention in each of the aforementioned second and third embodiments, and the smartphone 804 (camera 804*f*) is employed as the "position acquisition portion" according to the present invention in the aforementioned seventh embodiment, the present invention is not restricted to this. According to the present invention, a member other than the receiving portion, the stereo camera, and the smartphone may alternatively be employed so far as the member can acquire the positional information about the trailer. Alternatively, the receiving portion, the stereo camera, and the smartphone may be employed in combination. Thus, the small craft can be more reliably and easily attached and released.

While it is determined whether or not the speed of the craft body, the rotational speed of the engine, the acceleration of the craft body, and the angular speed of the craft body are not more than the respective prescribed thresholds in order to switch to the automatic trailer mode in each of the aforementioned first and second embodiments, the present invention is not restricted to this. According to the present invention, it may alternatively be determined whether or not one of the speed of the craft body, the rotational speed of the engine, the acceleration of the craft body, and the angular speed of the craft body is not more than the prescribed threshold in order to switch to the automatic trailer mode. Furthermore, it may alternatively be determined whether or not two or three of the speed of the craft body, the rotational speed of the engine, the acceleration of the craft body, and the angular speed of the craft body are not more than the respective prescribed thresholds.

While the weather information is acquired by the tidal current sensor and the wind speed sensor in each of the aforementioned first and second embodiments, the present invention is not restricted to this. The weather information about the location of the small craft may alternatively be acquired through the Internet, for example.

While the three transmitters are provided in the substantially central portion of the trailer in the width direction and in both ends of the trailer in the width direction in the aforementioned first embodiment, the present invention is not restricted to this. According to the present invention, only one transmitter may alternatively be provided, or two or four or more transmitters may alternatively be provided. When a plurality of transmitters are provided, the transmitters are preferably provided at least on both ends of the trailer in the width direction.

In the case where the user on the small craft operates the shift lever in the automatic trailer mode in which the controller controls the propulsion device on the basis of the positional information about the trailer during the release operations and the attachment operations according to the aforementioned second embodiment, a shift operation performed by the user may be prioritized. In this case, the automatic trailer mode is not turned on, and the user can operate the small craft.

In the case where the small craft fails to be attached to the trailer and slides to the water surface again in docking during the attachment operations according to the aforementioned second embodiment, the controller may return to the step S51 in FIG. 12 again to automatically perform the attachment operations again.

While the structure according to the present invention is applied to the jet boat configured to obtain a propulsive force by ejecting a jet of water in each of the aforementioned first to seventh embodiments, the present invention is not restricted to this. The structure according to the present invention may alternatively be applied to a boat mounted with an outboard motor as the propulsion device.

While "LAUNCH" and "DOCK" displayed on the display portion 215*d* glow red during the automatic release operations and the automatic attachment operations, respectively, so that the user is notified of those in the aforementioned second embodiment, the present invention is not restricted to this. According to the present invention, the trailing system of the small craft may alternatively be configured to notify the user of that the automatic release operations and the automatic attachment operations are underway by another notification method. For example, a notification sound such as a buzzer sound may be emitted from the small craft and the radio remote control or predetermined lamps provided on the small craft and the radio remote control may be lighted during the automatic release operations and the automatic attachment operations. Furthermore, the trailing system of the small craft may not continuously notify the user of that the automatic release operations and the automatic attachment operations are underway during the automatic release operations and the automatic attachment operations, but may notify the user of that the automatic release operations are started and finished and the automatic attachment operations are started and finished only when the automatic release operations are started and finished and the automatic attachment operations are started and finished.

While the indicator 302*g* is mounted on the upper end of the pole 302*f* in the aforementioned third embodiment, the present invention is not restricted to this. According to the present invention, the indicator may not be mounted on the pole, but may be mounted on another portion. In this case, the indicator is preferably arranged vertically above the pair of supporting portions.

While the stereo camera 214*a* is employed as the "target recognizer" according to the present invention in the aforementioned second embodiment, the present invention is not restricted to this. According to the present invention, an ultrasonic sensor, a radar such as a millimeter-wave radar, a laser sensor, a laser radar (LiDAR), etc. may alternatively be employed as the target recognizer, for example. While the cross pattern is provided on the indicator 302*g* in the aforementioned third embodiment, the present invention is not restricted to this. According to the present invention, instead of the cross pattern, a marker that the position acquisition portion (target recognizer) easily recognizes may alternatively be provided as the indicator, for example. When the ultrasonic sensor, the radar such as the millimeter-wave radar, the laser sensor, or the laser radar (LiDAR), etc. are employed as the target recognizer, the marker is preferably made of a material that easily reflects ultrasonic waves, radio waves such as millimeter waves, light (laser), etc. Furthermore, another pattern such as a star pattern may alternatively be provided on the indicator instead of the cross pattern.

While the left propulsion device 410 and the right propulsion device 510 are provided in the small craft 401 in the aforementioned fourth embodiment, the present invention is not restricted to this. For example, a single propulsion device and a bow thruster or a side thruster may alternatively be provided in the small craft so that the small craft is able to move parallel from side to side, turn its bow, and so on.

While the shift lever 415b to be operated by the user to switch the shift state and the throttle opening is provided in the small craft 401 in the aforementioned fourth embodiment, the present invention is not restricted to this. According to the present invention, a shift lever to be operated by the user to switch the shift state and a remote control lever to be operated by the user to switch the throttle opening may alternatively be provided separately from each other in the small craft. In this case, when the user operates the shift lever so that the shift lever is at the neutral position, and operates the remote control lever so that the remote control lever is at an idling opening degree, shifting to the automatic trailer mode is performed.

While the controller 611 acquires the thrust force of the propulsion device 610 on the basis of the engine rotational speed acquired from the ECU 12a, and the graph illustrating the engine rotational speed-thrust force characteristics during forward propulsion and the graph illustrating the engine rotational speed-thrust force characteristics during backward propulsion recorded in the memory 614c during the operations for releasing the craft body 1a and the operations for attaching the craft body 1a in the aforementioned fifth embodiment, the present invention is not restricted to this. For example, a relational expression ($Y_1 = A \cdot X_1^\alpha$) between the engine rotational speed ($X_1$) and the thrust force ($Y_1$) illustrated in FIG. 20 and a relational expression ($Y_2 = B \cdot X_2^\beta$) between the engine rotational speed ($X_2$) and the thrust force ($Y_2$) illustrated in FIG. 21, where A, $\alpha$, B, and $\beta$ are constants, may alternatively be employed instead of the graph illustrating the engine rotational speed-thrust force characteristics during forward propulsion and the graph illustrating the engine rotational speed-thrust force characteristics during backward propulsion, respectively.

While the thrust force of the propulsion device 610 is acquired on the basis of the engine rotational speed acquired from the ECU 12a in the aforementioned fifth embodiment, the present invention is not restricted to this. According to the present invention, the thrust force of the propulsion device may alternatively be acquired on the basis of the rotational speed (propeller rotational speed) of a propeller of the propulsion device driven by the engine instead of the engine rotational speed. Thus, the thrust force of the propulsion device is able to be more directly acquired on the basis of the rotational speed of the propeller that actually generates the thrust force of the propulsion device, and hence the propulsion device is more accurately controlled. The propeller rotational speed may be acquired by employing an optical sensor or the like. Furthermore, the thrust force of the propulsion device may alternatively be acquired on the basis of both the engine rotational speed and the propeller rotational speed.

While the controller 611 controls the rudder angle and the thrust force of the propulsion device 610 to move the craft body 1a to the front position of the trailer 2 while maintaining the state where the orientation of the bow of the craft body 1a with respect to the trailer 2 is the orientation substantially parallel to the longitudinal direction in which the pair of supporting portions 2b of the trailer 2 extend, in which the bow faces the trailer 2 in the aforementioned fifth embodiment, the present invention is not restricted to this. According to the present invention, it is only required that the orientation of the bow of the craft body with respect to the trailer be the orientation substantially parallel to the longitudinal direction, in which the bow faces the trailer when the small craft has been moved to the front position of the trailer (the vicinity of the attachment position of the trailer). In other words, until the small craft reaches the front position of the trailer, the orientation of the bow of the craft body of the small craft with respect to the trailer may not be substantially parallel to the longitudinal direction. In this case, the controller is preferably configured to calculate and control the necessary thrust force and rudder angle such that the orientation of the bow of the craft body with respect to the trailer is the orientation substantially parallel to the longitudinal direction, in which the bow faces the trailer at the time when the small craft is moved to the front position of the trailer (the vicinity of the attachment position of the trailer).

While the rudder angle of the propulsion device 610 is obtained on the basis of the rotation angle $\theta$ of the injection nozzle body 610d about the rotation shaft 610e detected by the nozzle rotation sensor 613i in the aforementioned fifth embodiment, the present invention is not restricted to this. According to the present invention, the rudder angle of the propulsion device may alternatively be obtained from another parameter other than the rotation angle of the injection nozzle body. The rudder angle of the propulsion device may be obtained on the basis of variations in the rotational speed of the injection nozzle body about the rotation shaft, the sliding amount of the arm, the oil quantity of the hydraulic cylinder, etc., for example.

While the small craft 801 is not provided with a stereo camera 214a, GNSS receiving portion 14b, obstacle detection sensor 13c, acceleration sensor 13f, speed sensor 13g, or angular speed sensor 13h in the aforementioned seventh embodiment, the present invention is not restricted to this. According to the present invention, even when the smartphone is employed, the small craft may alternatively be provided with any of the stereo camera, the GNSS receiving portion, the obstacle detection sensor, the acceleration sensor, the speed sensor, and the angular speed sensor. Thus, the same types of information (the positional information about the trailer, for example) may be acquired, and hence the controller of the small craft is able to perform precise control. Furthermore, a navigation system including a GNSS receiving portion, a digital camera, etc. may alternatively be employed instead of the smartphone, for example. In other words, a device other than the smartphone may be employed in the aforementioned seventh embodiment.

While the small craft 801 wirelessly communicates with the smartphone 804 in the aforementioned seventh embodiment, the present invention is not restricted to this. According to the present invention, the small craft may alternatively communicate with the smartphone in a wired manner.

While the processing operations performed by the controller are described, using the flowcharts described in a flow-driven manner in which processing is performed in order along a processing flow for the convenience of illustration in each of the aforementioned first, second, fourth, and fifth embodiments, the present invention is not restricted to this. According to the present invention, the processing operations performed by the controller may alternatively be performed in an event-driven manner in which processing is performed on an event basis. In this case, the processing operations performed by the controller may be performed in a complete event-driven manner or in a combination of an event-driven manner and a flow-driven manner.

What is claimed is:

1. A small craft comprising:
   a craft body;
   a propulsion device configured to propel the craft body;
   a position acquisition portion configured to acquire trailer positional information about a position of a trailer for carrying the craft body;
   a controller including a digital signal processor or a dedicated signal processing circuit configured to automatically control the propulsion device on the basis of the trailer positional information during one or more operations selected from the group consisting of an operation for releasing the craft body from the trailer and an operation for attaching the craft body to the trailer; and
   an attitude detection portion configured to detect an attitude of the craft body; wherein
   the controller is configured to determine whether or not the craft body is attached to an attachment position of the trailer for the craft body on the basis of the trailer positional information and the attitude of the craft body.

2. The small craft according to claim 1, wherein the controller is configured to:
   acquire distance information which corresponds to a distance from the craft body to the trailer on the basis of the trailer positional information, and
   control the propulsion device on the basis of the distance information.

3. The small craft according to claim 2, wherein the controller is further configured to:
   acquire an orientation information corresponding to an orientation of the craft body with respect to the trailer, in addition to the distance information, and
   control the propulsion device to move the craft body to the attachment position on the basis of the distance information and the orientation information.

4. The small craft according to claim 3, further comprising:
   a position detection portion configured to detect craft body positional information about the craft body; and
   a first recording portion configured to record information relating to the craft body; herein
   the controller is configured to:
   record sailing track information of the craft body, which corresponds to a sailing track of the craft body, in the first recording portion on the basis of the craft body positional information when moving the craft body to the attachment position, and when failing to move the craft body to the attachment position, control the propulsion device to cause the craft body to return to a position, from which the craft body is movable to the attachment position, along the sailing track based upon the sailing track information recorded in the first recording portion.

5. The small craft according to claim 3, wherein the controller is configured to control the propulsion device to move the craft body to the attachment position when at least one of a speed of the craft body is not more than a craft body speed prescribed threshold, a rotational speed of an engine is not more than an engine rotational speed prescribed threshold, an acceleration of the craft body is not more than a craft body acceleration prescribed threshold, and an angular speed of the craft body is not more than a craft body angular speed prescribed threshold.

6. The small craft according to claim 3, further comprising a second recording portion configured to record attachment position information of the attachment position; wherein the controller is configured to determine whether or not the craft body is movable to the attachment position on the basis of the attachment position information recorded in the second recording portion.

7. The small craft according to claim 1, further comprising a radio remote control operated by a user and configured to transmit an operation signal; wherein
   the controller is configured to control the propulsion device on the basis of the trailer positional information in response to the controller receiving the operation signal from the radio remote control.

8. The small craft according to claim 1, wherein
   the controller is configured to control the propulsion device on the basis of the attitude information in addition to the trailer positional information.

9. The small craft according to claim 1, wherein the controller is configured to control the propulsion device on the basis of weather information, in addition to the trailer positional information.

10. The small craft according to claim 1, wherein the controller is configured to control the propulsion device to propel the craft body backward in a direction away from the attachment position on the basis of the trailer positional information.

11. The small craft according to claim 10, wherein the controller is configured to control the propulsion device to hold the craft body at a fixed point away from the attachment position.

12. The small craft according to claim 10, wherein the controller is configured to determine whether or not to propel the craft body backward in the direction away from the attachment position on the basis of at least one of a fixation state of a fixation portion configured to fix the craft body to the trailer, a position of the propulsion device in a vertical direction relative to a water surface, and a presence or absence of an obstacle around the craft body.

13. The small craft according to claim 12, further comprising an obstacle detection portion configured to detect whether an obstacle is around the craft body; wherein
   during backward propulsion of the craft body in the direction away from the attachment position, the controller is configured to control the propulsion device to stop propelling the craft body backward when the obstacle detection portion detects that an obstacle has appeared.

14. The small craft according to claim 1, wherein the position acquisition portion includes a target recognizer.

15. The small craft according to claim 1, wherein the position acquisition portion comprises a receiving portion configured to receive a signal transmitted from a transmitter of the trailer.

16. The small craft according to claim 1, further comprising an obstacle detection portion arranged vertically above a chine line of the craft body, and configured to detect whether an obstacle is around the craft body.

17. The small craft according to claim 1, wherein the trailer is provided with:
   a supporting portion on which the craft body is loadable, and an indicator arranged vertically above the supporting portion; and
   the position acquisition portion is configured to acquire the trailer positional information on the basis of a position of the indicator.

18. The small craft according to claim 1, further comprising a switching operation portion configured to allow a user to switch a shift state of the propulsion device and a throttle opening of the propulsion device; wherein when the switching operation portion is operated such that the shift state of the propulsion device is a neutral state and the throttle opening of the propulsion device is an idling opening, the controller is configured to perform at least one of the operation for releasing the craft body from the trailer and the operation for attaching the craft body to the trailer by controlling the propulsion device.

19. The small craft according to claim 1, wherein the controller is configured to:

acquire an orientation of the craft body with respect to a supporting portion of the trailer on which the craft body is loadable on the basis of the trailer positional information when moving the craft body to the attachment position, and automatically control the propulsion device such that the orientation of the craft body is substantially parallel to a direction in which the supporting portion extends on the basis of the orientation of the craft body with respect to the supporting portion of the trailer.

20. The small craft according to claim 19, wherein the controller is configured to control the propulsion device such that at least one of a position and an orientation of the craft body is held in a vicinity of the attachment position.

21. The small craft according to claim 1, wherein the propulsion device includes a plurality of propulsion devices; and steering of the plurality of propulsion devices is able to be controlled independently of each other.

22. The small craft according to claim 1, wherein the controller is configured to:

acquire a thrust force of the propulsion device from at least one of a rotational speed of an engine and a rotational speed of a propeller, and control the thrust force of the propulsion device on the basis of the acquired thrust force of the propulsion device.

23. A small craft trailing system comprising:

a small craft; and a trailer, including a signal output portion configured to output a signal, on which the small craft is loadable; wherein the small craft includes:

a craft body which is loadable on the trailer;

a propulsion device configured to propel the craft body;

a position acquisition portion configured to acquire trailer positional information, about a position of the trailer, by receiving the signal output from the signal output portion of the trailer;

a controller that includes a digital signal processor or a dedicated signal processing circuit configured to automatically control the propulsion device on the basis of the trailer positional information during one or more operations selected from the group consisting of an operation for releasing the craft body from the trailer and an operation for attaching the craft body to the trailer; and an attitude detection portion configured to detect an attitude of the craft body; and the controller is configured to determine whether or not the craft body is attached to an attachment position of the trailer for the craft body on the basis of the trailer positional information and the attitude of the craft body.

24. The small craft trailing system according to claim 23, wherein the signal output portion of the trailer includes a transmitter configured to transmit the signal.

25. The small craft trailing system according to claim 24, wherein the transmitter includes a plurality of transmitters mounted on the trailer.

26. The small craft trailing system according to claim 23, further comprising a radio remote control to be operated by a user, configured to transmit an operation signal; wherein the controller of the small craft is configured to control the propulsion device on the basis of the trailer positional information in response to the controller receiving the operation signal from the radio remote control.

\* \* \* \* \*